US010248387B2

(12) United States Patent
Bharthulwar

(10) Patent No.: US 10,248,387 B2
(45) Date of Patent: Apr. 2, 2019

(54) INTEGRATED SYSTEM FOR SOFTWARE APPLICATION DEVELOPMENT

(71) Applicant: Shridhar V. Bharthulwar, Superior, CO (US)

(72) Inventor: Shridhar V. Bharthulwar, Superior, CO (US)

( * ) Notice: Subject to any disclaimer, the term of this patent is extended or adjusted under 35 U.S.C. 154(b) by 0 days.

(21) Appl. No.: 15/921,896

(22) Filed: Mar. 15, 2018

(65) Prior Publication Data

US 2018/0210709 A1 Jul. 26, 2018

Related U.S. Application Data

(63) Continuation-in-part of application No. 15/271,465, filed on Sep. 21, 2016, now Pat. No. 10,001,975.

(51) Int. Cl.
*G06F 9/44* (2018.01)
*G06F 9/445* (2018.01)
(Continued)

(52) U.S. Cl.
CPC ............ *G06F 8/24* (2013.01); *G06F 8/33* (2013.01); *G06F 8/34* (2013.01); *G06F 8/36* (2013.01);
(Continued)

(58) Field of Classification Search
CPC ...... G06F 9/4856; G06F 9/4448; G06F 9/465; G06F 9/541; G06F 17/227; G06F 8/20;
(Continued)

(56) References Cited

U.S. PATENT DOCUMENTS 6,523,027 B1 * 2/2003 Underwood ............ G06F 9/465
6,601,233 B1 * 7/2003 Underwood .............. G06F 8/24
717/100

(Continued)

OTHER PUBLICATIONS

Jack Greenfield et al., Software Factories Assembling Applications with Patterns, Models, Frameworks and Tools, ACM 1-58113-751-6, Oct. 26-30, 2003, [Retrieved on Jan. 2, 2019]. Retrieved from the internet: <URL: http://delivery.acm.org/10.1145/950000/949348/p16-greenfield.pdf?> 12 Pages (16-27) (Year: 2003).*

(Continued)

*Primary Examiner* — Anibal Rivera
(74) *Attorney, Agent, or Firm* — Patent Law Offices of Rick Martin, P.C.

(57) ABSTRACT

Methods and systems are disclosed for developing a software application through requirements specification, design, effort estimation, assigning and tracking work items, development, testing, collaboration and project management. The system is structured as an integrated software development system allowing for structured, systematic and user friendly set up of requirements specification (including workflow, user interface, business rules and integrations), technical design for UI features and integrations using design patterns, automated effort estimation, automated story card and task creation. The system also provides a novel, audio-video playback capability for workflow visualization. Further, the system provides visual depiction of defects and changed items side-by-side with requirements, as well as predictive modeling of defects that allows for forecasting of defect completion rate. In the preferred embodiment, the system is delivered as a multi-tenant Software as a Service.

25 Claims, 22 Drawing Sheets

(51) Int. Cl.
*G06F 11/36* (2006.01)
*G06F 9/46* (2006.01)
*G06F 8/20* (2018.01)
*G06F 8/33* (2018.01)
*G06F 8/34* (2018.01)
*G06F 8/77* (2018.01)
*G06Q 10/10* (2012.01)
*G06F 8/73* (2018.01)
*G06F 8/36* (2018.01)

(52) U.S. Cl.
CPC .............. *G06F 8/73* (2013.01); *G06F 8/77* (2013.01); *G06Q 10/103* (2013.01)

(58) Field of Classification Search
CPC ..... G06F 8/74; G06F 8/34; G06F 8/10; G06F 8/61; G06F 8/24; G06F 8/73; G06F 11/3684; G06F 11/3688
See application file for complete search history.

(56) References Cited

U.S. PATENT DOCUMENTS

| | | | | |
|---|---|---|---|---|
| 6,609,128 B1* | 8/2003 | Underwood | ............ | G06F 9/454 707/610 |
| 6,611,822 B1* | 8/2003 | Beams | ............ | G06Q 10/10 706/11 |
| 6,704,873 B1* | 3/2004 | Underwood | ............ | H04L 63/02 709/223 |
| 6,907,546 B1* | 6/2005 | Haswell | ............ | G06F 11/3684 714/38.11 |
| 7,055,130 B2* | 5/2006 | Charisius | ............ | G06F 8/20 717/108 |
| 7,114,149 B2* | 9/2006 | Aptus | ............ | G06F 8/20 715/209 |
| 7,415,697 B1* | 8/2008 | Houlding | ............ | G06F 8/75 709/224 |
| 7,644,390 B2* | 1/2010 | Khodabandehloo | ...... | G06F 8/73 715/717 |
| 2002/0023257 A1* | 2/2002 | Charisius | ............ | G06F 8/20 717/106 |
| 2002/0032900 A1* | 3/2002 | Charisius | ............ | G06F 8/20 717/106 |
| 2002/0104071 A1* | 8/2002 | Charisius | ............ | G06F 8/20 717/109 |
| 2002/0108101 A1* | 8/2002 | Charisius | ............ | G06F 8/20 717/105 |
| 2002/0112225 A1* | 8/2002 | Charisius | ............ | G06F 8/20 717/125 |
| 2003/0009357 A1* | 1/2003 | Pish | ............ | G06Q 10/10 705/4 |
| 2006/0041502 A1* | 2/2006 | Blair | ............ | G06F 17/227 705/37 |
| 2006/0053380 A1* | 3/2006 | Spataro | ............ | G06F 17/30011 715/753 |
| 2007/0240154 A1* | 10/2007 | Gerzymisch | ............ | G06F 8/61 717/174 |
| 2008/0005235 A1* | 1/2008 | Hegde | ............ | G06Q 10/10 709/204 |
| 2008/0312980 A1* | 12/2008 | Boulineau | ............ | G06Q 10/06 705/7.13 |
| 2008/0313008 A1* | 12/2008 | Lee | ............ | G06Q 10/06 705/7.23 |
| 2008/0313110 A1* | 12/2008 | Kreamer | ............ | G06Q 10/06 706/12 |
| 2008/0313595 A1* | 12/2008 | Boulineau | ............ | G06F 8/20 717/101 |
| 2008/0313596 A1* | 12/2008 | Kreamer | ............ | G06F 8/20 717/101 |
| 2009/0199113 A1* | 8/2009 | McWhinnie | ............ | G06Q 10/06 715/762 |
| 2009/0276752 A1* | 11/2009 | Sharma | ............ | G06F 8/20 717/103 |
| 2009/0276771 A1* | 11/2009 | Nickolov | ............ | G06F 9/4856 717/177 |
| 2010/0153782 A1* | 6/2010 | Chandra | ............ | G06F 11/3616 714/37 |
| 2010/0211924 A1* | 8/2010 | Begel | ............ | G06F 8/74 717/101 |
| 2011/0066486 A1* | 3/2011 | Bassin | ............ | G06Q 10/00 705/14.43 |
| 2011/0066490 A1* | 3/2011 | Bassin | ............ | G06Q 10/06 705/14.48 |
| 2011/0191747 A1* | 8/2011 | Charisius | ............ | G06F 8/20 717/103 |
| 2013/0132285 A1* | 5/2013 | Richards | ............ | G06F 9/541 705/300 |
| 2013/0268437 A1* | 10/2013 | Desai | ............ | G06Q 20/08 705/41 |
| 2014/0026113 A1* | 1/2014 | Farooqi | ............ | G06F 8/36 717/107 |
| 2014/0075004 A1* | 3/2014 | Van Dusen | ............ | H04L 41/04 709/223 |
| 2014/0089690 A1* | 3/2014 | Fukuda | ............ | G06F 1/26 713/300 |
| 2014/0089890 A1* | 3/2014 | Martin | ............ | G06F 8/10 717/105 |
| 2017/0329582 A1* | 11/2017 | Steven | ............ | G06F 8/43 |

OTHER PUBLICATIONS

O. David et al., A Software Engineering Perspective on Environmental Modeling Framework Design: The Object Modeling System, 2013, [Retrieved on Jan. 2, 2019]. Retrieved from the internet: <URL: http://ac.els-cdn.com/S1364815212000886/1-s2.0-S1364815212000886-main.pdf> 13 Pages (201-213) (Year: 2013).*

* cited by examiner

| | | | | |
|---|---|---|---|---|
| Entity/Field | Data Type | Custom | Required | Description |
| Account | Object (Entity) | | | Account entity represents a customer |
| - Account ID | Number (9) | | | ID of the customer account |
| - Account Name | Text (80) | | | Name of the account |
| - Account Type | Picklist | | | Type of the account |
| - Account Status | Picklist | | | Account status |
| Contact | Object (Entity) | | | Contact entity represents a person |
| - Contact ID | Number (9) | | | ID of the Contact |
| - Contact Name | Text (40) | | | Name of the person |
| - Contact Type | Picklist | | | Type of the contact |
| - Contact Status | Picklist | X | | Status of the contact |

FIGURE 20

INTEGRATED SYSTEM FOR SOFTWARE APPLICATION DEVELOPMENT

CROSS REFERENCE PATENTS

This non provisional application claims priority from the U.S. Provisional Patent application No. 62/221,196 filed Sep. 21, 2015, which is incorporated herein by reference in its entirety, and is a Continuation In Part of U.S. application Ser. No. 15/271,465, issued as U.S. Pat. No. 10,001,975 issued 6/19/2018.

BACKGROUND OF THE INVENTION

Field of the Invention

The subject disclosure relates to methods and a system for an integrated approach for software application development. The software development process is characterized by an iterative cycle of requirements analysis, design & architecture, software coding, functional testing, and integration testing. The value chain of software delivery usually points in the opposite direction of the steps in the process. That is, the first two steps of requirements analysis and design have an outsized impact on the entire software delivery life cycle. Poorly documented user requirements and design can adversely affect the entire cycle in such a way that extra effort spent in coding and testing cannot rescue the initial value lost.

The subject disclosure relates to systems and methods for software application development at all levels, integrating tools vertically through the development life cycle and creating a structured view of the data inside the software development cycle. This present invention addresses the requirements analysis, design, development and testing aspects of software development through systematic tools and methods. The central core of the present invention revolves around requirements specification for software application development. Requirements specifications for software applications in the context of the present invention comprises a business process workflow, user interface specifications, business rules specifications, integration requirements and design, and integration interface data fields. Beyond requirements specifications, the present invention also addresses collaboration, test case generation, defect management (creating, managing defects against the requirements), defect completion predictive modeling, effort estimation, tracking work progress, project planning and tracking, and a novel audio-visual playback of user stories. The present invention brings all these diverse aspects together on an integrated software development platform.

Description of the Related Art

Across the software development life cycle, there are many tools to aid in development and testing, but relatively few that aid in requirements analysis and design using a systematic approach. The general purpose tools (such as word processors, spreadsheets) used for requirements analysis and design result in an unstructured view of the data and suffer from a number of limitations. The first limitation is that there is not a single source of true data. This is also described as a lack of normalization, or keeping multiple copies of data elements in a consistent state. There is a potential for data elements to fall out of sync over time, leading to an inconsistent product. A second limitation is the limited concurrency available in general purpose toolsets. The inability to work concurrently on the same data element is a major challenge when teams are distributed or located offshore. A third limitation is the lack of consistency between current tools. The ability to manually share data between tools such as Excel, Word, Visio, and Outlook also results in an inability to enforce structure and format. The loose enforcement of consistency adds another item that must be externally managed, and provides a door for human errors to enter the process. A fourth limitation is the lack of productivity imposed by using a collection of general purpose tools. Using several different tools to handle text, formatted data, pictures, and diagrams is not efficient, user-friendly or intuitive. A fifth limitation is the limited incremental tracking available in general purpose tools. It is difficult, if not impossible, to track what exactly was changed, by whom and at what time, or when data is being manually administered by several parties in several locations. A sixth limitation with current software development tools is that the parties involved typically resort to email for communication, which is inefficient and lacks context. Collaboration through email mixed with social networking, separated from the work flow tools, can quickly lead to errors in understanding. A final limitation with current tools is the inability to search for items of interest in the data quickly. Searching across documents, searching meta-data, and even cross-media searches such as text embedded in a picture, is cumbersome or even impossible when using a collection of general purpose tools.

Many of the tools that purport to address the problems of the current collections of tools do not work at the most valuable levels of the software delivery chain. The requirements and design phases of software development account for roughly 40% of the total effort, but failure to address those early steps leads to an even greater loss later on in the development chain. The further up the value chain one goes, toward the requirements and design phases, several changes occur that make the common software solutions inefficient. For example, the increased interaction with end users and the more uncertainty and ambiguity don't mesh well with the current tools. The knowledge intensity and the lesser ability to automate mean that current tools are missing a large opportunity to add value to the development cycle early in the planning cycle.

One patent that documents a method for addressing the problem of managing communications in the development environment is U.S. Pat. No. 7,644,390 issued on Jan. 5, 2010, to Khodabandehloo, et al. Khodabandehloo discloses systems and methods for constructing a visual model of a software development project. This visual model is viewable by all members of the development team, each from his own perspective. The visual model changes dynamically to reflect changes made to the model by individual contributors. Khodabandehloo focuses only on the communication between team members and creating a visual representation of the development cycle. Khodabandehloo's present invention fails to address certain key aspects of the software development process such as an ability to create and specify design patterns, an ability to view changed user interface widgets with a graphical aid (such a capability is critical to enabling incremental, iterative development), setting up business rules specifications (which are a key element of software application requirements specification), automatic effort estimation, automatic test case generation, visual depiction of software defects side-by-side with the requirements, ability to playback the user story using an audio-visual playback, and collaboration.

SUMMARY OF THE INVENTION

Glossary—Definition of Terms

Agile Software Development: A software methodology that relies on iterative development (using Sprints), and recommends using self-organizing and cross-functional teams.

Waterfall Development: A software methodology in which, each phase such as requirements, design, development, and testing must be completed before the next phase can begin and there is no overlapping in the phases.

User Interface (UI): Commonly referred to as a "Graphical User Interface", allows users to interact with an application and enter information as well as view and update information related to the application.

User Interface Stylesheet: A stylesheet specifies the style elements for the look and feel of the user interface, which includes such attributes as Fonts, various dimensions of widgets, rounding, gradient colors, line colors, background colors, text colors, spacing between widgets etc.

User Story: Refers to a user interaction with the system, describing how the user interacts with the system with the goal of accomplishing specific tasks. A User Story typically addresses a unique and well defined task (e.g. create customer account) that represents a distinct business process.

User Story Step: A User Story comprises of steps—these are referred to as User Story Steps in the present invention. Each of the user story steps represents a concrete user interface screen of the software application.

Requirement Specification: The complete set of specifications needed to build a software application. This includes the workflow, user interface details, UI widget details, business rules, integration points, integration interfaces and associated rules.

Design Specification: Allows software developers and testers to build a complex software application with necessary details regarding the design components, program flow logic and system interactions.

Widget: A widget on a UI allows a user to enter or view a specific piece of data field—for example a Text Field, Date Field, Dropdown List, Checkbox, Radio Button etc.

Integration Point: An integration point represents an application integration between two applications to exchange data or perform business services. Such integrations are needed to retrieve data from external systems (for example to retrieve credit scores for customers) or to send data to downstream systems for various reporting and analytical needs. An integration point typically comprises one or more integration interfaces.

Integration Interface: An integration interface represents an atomic programmatic interface between two applications that supports a unique service operation. An integration point typically consists of one or more integration interfaces.

Design Pattern: A design pattern is an architectural pattern that specifies a common approach and architecture for an application feature development or integration development. Design patterns allow you to think of solution architecture using recurring and re-usable architecture solutions.

Design Component: A design pattern further comprises Design Components. They are the embodiment of a particular software design component that represent software program modules with distinct responsibilities.

Design Document: A design document specifies the technical architecture and design of an integration to a sufficient level of detail that allows software developers to write the program code and testers to test the integration using various testing tools and techniques.

Story Card: A Story Card represents some work item (for example testing an application feature as part of an application) that needs to be completed in order to build a piece of functionality for a software application. A story card has tasks associated with it, as well as an effort estimate that is used for project planning purposes.

Estimate: Estimate of a work item (such as requirements analysis, design, development, testing etc.) is the effort estimate in hours for completing the work item.

Burn Down Chart: A graphical chart that represents the progress of the team in achieving the goals of an iteration.

Defect: A software defect is a deviation of the software functionality from the defined requirement specification.

Defect Severity: The defect severity indicates the severity of the defect—the likely impact caused from the impact.

Defect Priority: The defect priority indicates the priority for fixing this defect (this is driven by the business value lost due to the defect).

Build Environment: A build environment is where a software application is deployed and tested.

Business Rule: A business rule allows us to specify business logic associated with a User Interface, a widget or an integration interface. Such a business rule describes the behavior of the system under specific conditions. Typically these take the form—IF (this condition is met) THEN (perform this action).

Business Rule Group: A folder or a container that houses Business Rules, as well as other Business Rule Groups (they can be nested—a rule group can comprise of more rule groups).

Custom Data Fields: Allows users to define custom data attributes that they wish to store and track on various data constructs such as Defects, Story Cards, Business Rule Groups and so on. A custom data field can be of the type—Boolean (yes/no), Free Form Text, Numerical values, Type values (drop down values) or Date Values.

The present invention is directed to a method of organizing software application development, specifically by constructing a structured model of the software requirements that is used to track the entire project from start to completion. This model is based on the information that describes the software project at every level—from requirements, design, testing to project management.

In describing the conceptual high-level aspects of the system, the system is used for:

1) Specifying the requirements and design of the software application to be developed using a visual approach
2) Automatically generating requirements and design documents with computer generated images and text content based on user inputs
3) Automatically generating an audio-video playback of the application features 4) Automatically generating effort estimates for application features based on template data entered by users
5) Automatically generating project management tasks based on template data entered by users
6) Automatically generating test cases based on the requirements specifications,
7) Entering, tracking and fixing defects
8) Managing project management related aspects such as scheduling work items and capacity planning
9) Collaborating by creating and participating in discussion threads
10) Performing advanced text search to find items of interest FIG. 1 describes the computing environment that can be used to realize the present invention. In the preferred embodiment, the present invention is delivered as a Software as a Service (SaaS) application. The present invention allows for a multi-tenant delivery—allowing for multiple organizations to be supported on the same SaaS application instance. Private-cloud or on premise delivery options can also be realized for the present invention. Service consumers access the SaaS application using a client application on a computing device (such as a desktop computer, laptop computer or mobile access devices such as smart phones, tablets) shown by the reference numerals 101 and 102. These client devices access the server application through an Application Programming Interface (API). On the server side, the application is deployed on a cluster of application servers shown by reference numeral 103 that allows scalability and failover capability. A load balancer 105 provides load balancing capability that allows the incoming API requests to be distributed evenly across the nodes in the application server cluster. The application server cluster persists the data in a database 104. The application server persists some of the data in a file storage mechanism 106 for image files, file attachments and so on. The application server cluster also communicates with an external Text to Speech Service Provider 108 using an Application Programming Interface (API). The Text to Speech service is used to convert user defined text into computer generated speech and then used in the audio-video playback feature. The application server cluster also communicates with a Text Search server 107 using an Application Programming Interface (API). The Text Search server builds an index based on textual data stored in the various artifacts produced in the system. Once an index is created, the Text Search server allows for advanced search capabilities beyond what you typically find in word processing tools or spreadsheets.

The present invention overcomes the inability of a collection of disparate tools to track and manage an entire software application development cycle. Specifically, the invention addresses shortcomings in several areas. The first area is in the software requirements specification. Referring to FIG. 2, the system provides user friendly and intuitive tools for setting up user interface and integration interface requirements. Such requirements consist of a business process workflow, user Interface specifications associated with each step of the workflow (including dynamic display), business rules associated with the workflow and user interface, integration point specifications as they connect to a user interface in a workflow, and integration interface specifications—including data fields and integration patterns.

FIG. 2 is a flow chart of how the present invention is used in the software development process. This process can be used in a waterfall, agile (iterative development) or hybrid methodologies. In an Agile (iterative development) methodology, steps 202, 203 and 204 are repeated iteratively. The present invention is not limited to any particular development methodology. A detailed description of the elements on this figure is as follows:

1. Administrative set up 201: Allows the user to set up administrative data related to the software application development project—such as user administration (setting up users, roles and permissions), administrative data set up (such as build environments, blocker reasons for story cards, user story actors and more), and custom data fields set up.
2. Requirements and Design set up 202: First the Software Development project is created and certain aspects such as style sheets, integration patterns, estimate template, sprints schedule are configured. Then, the software requirements specifications are developed for the user interface, business rules and integrations.
3. Software Development 203: Developers build the software application using the requirements and design specification as the guidelines. They utilize automatically generated Integration Design Documents to aid in the development process. They also utilize the automatically generated Business Requirements Document to aid in the development of user interfaces and associated business rules.
4. Software Testing 204: The testing phase comprises three progressively more intensive phases, functional testing, integration testing and system testing (which typically includes performance and stress testing as well). At the end of the testing phase, once a particular target level of software quality is achieved, the software application is deemed fit for release to the customers.

The sequence and repetition of the above four phases can vary with the type of development methodology being used. In Agile methodology, the requirements, design and functional testing phases are repeated in every iteration. Such a process of repeated iterations is then typically followed by a phase of integration and system testing. Other approaches tend to mix these in with the iterative development as well.

The present invention helps with all the above four phases of the software application development, regardless of the methodology being utilized.

It is another aspect of the present invention to provide integration interface and UI technical design specifications. The system provides systematic and user friendly tools for setting up re-usable design patterns which then can be applied and re-used across a number of integration interfaces and UI screens. Design patterns are defined at the design component level, allowing the developers to see enough technical detail to implement the software application according to the specified technical design.

Another aspect of the present invention is to automate many steps of the development process that remain manual items in the current art. This includes estimation of effort associated with the user interface and integration interface, automatic creation of story cards and tasks from requirements for managing the software development process. Further automation provided by the present invention are the automatic creation of test cases from UI requirements (both incremental and regression test cases), automatic creation of business requirements documents and automatic creation of integration and UI design documents. A further aspect of the present invention is providing defect management capability—the ability to create and assign defects to user interface or integration interface, and the ability to visually depict the defects on a workflow, user interface, or integration point (color coded for severity).

Another aspect of the present invention is to provide collaboration tools that provide the ability for users to post comments and questions and also enable management of the lifecycle of such questions (including tracking and notifying the responsible user).

In the preferred embodiment, the system is delivered as a multi-tenant Software as a Service (SaaS) application in the public-cloud. This allows for multiple organizations (known as consumers) to use the software application yet have the ability to customize the application to their specific needs in a number of ways. This is however not required, as other embodiments may choose to deliver the software using either on premise software application or a private-cloud.

The system in the present invention is not limited to a particular methodology of software development (such as Agile, Waterfall or a hybrid of the two). The benefits of the present invention can be realized in various software development methodologies, though the benefits may be best aligned with an agile approach that utilizes an iterative development methodology.

These and other features and advantages of the present invention reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods which are meant to exemplify and to illustrate, not being limiting in scope.

BRIEF DESCRIPTION OF THE DRAWINGS

FIG. 20 is an exemplary graphical user interface showing how data model requirements such as data model objects and fields are captured;

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF PREFERRED EMBODIMENTS

The subject disclosure overcomes many of the prior art problems associated with using a collection of tools to manage the software development process. Of particular importance is the integration provided between various aspects of the software development process, and how they are visualized and connected together for a comprehensive and holistic view of the software development process from requirements analysis, design, development to testing and project management.

Figure 3:
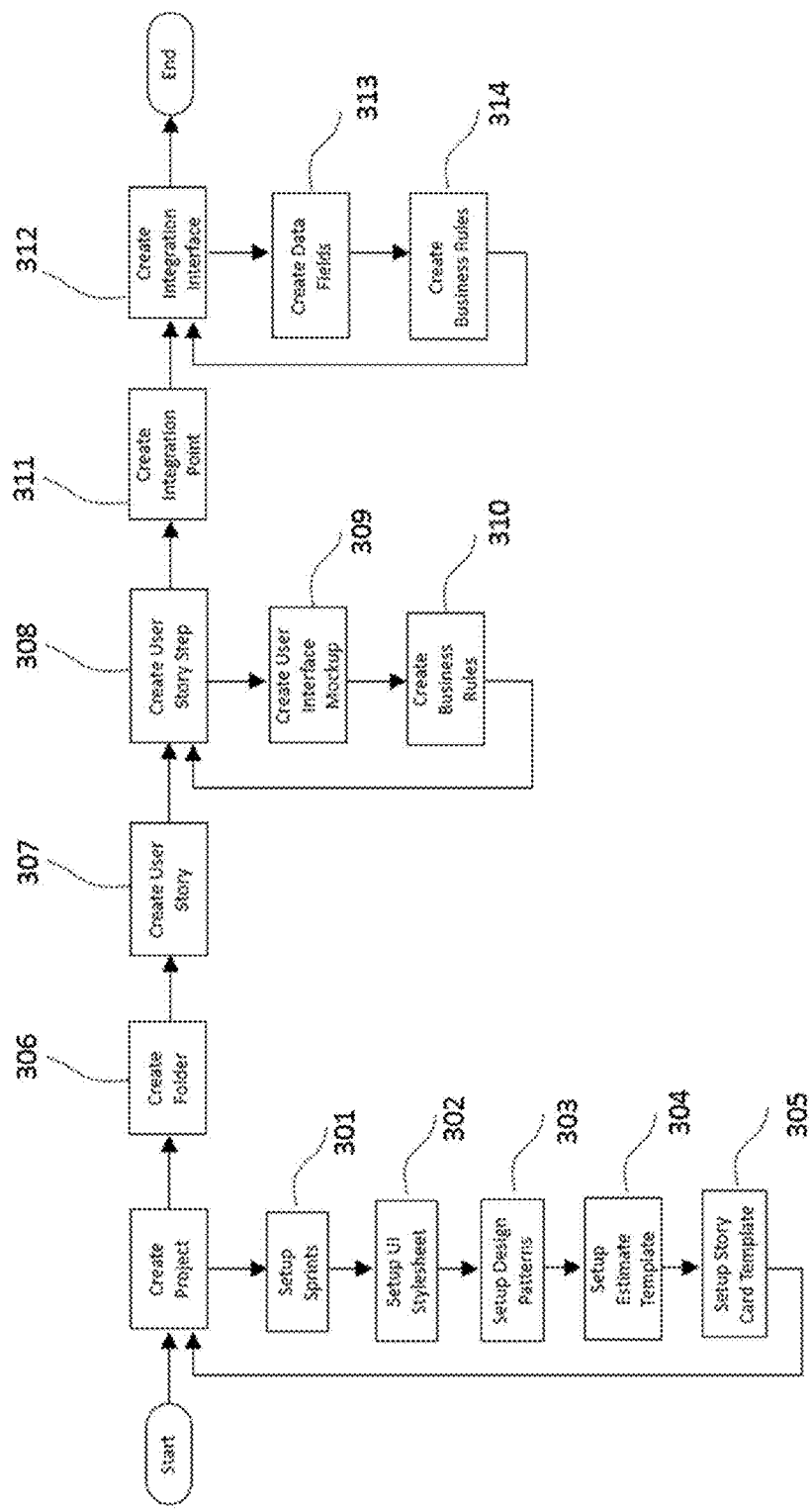
FIG. 3 shows the specific process flow of creating a user story requirements and design specifications using the present invention.

FIG. 3 illustrates the core activities of the system—setting up the requirements and design specifications for the software application. It covers the steps involved in setting up the requirements and design for a software application from start.

The individual elements of FIG. 3 are described as follows:
1. Release and Sprints set up 301: Allows users to define the timeline aspect of project management, the duration and number of sprints for the project release.
2. Style sheet set up 302: Allows users to specify a user interface style sheet which specifies the look and feel aspects of the user interface widgets
3. Design patterns set up 303: Allows users to specify design patterns which are re-usable architectural patterns that can be applied for individual integration interfaces and UI screens
4. Estimate Template set up 304: Allows users to specify estimate factors associated with user interface and integrations
5. Story Card Templates set up 305: Allows users to specify story card creation templates that specify what tasks (story cards) should be created automatically for each UI screen and integration interface
6. Create Folders 306: A folder is a grouping construct allowing users to group related user stories in a single folder
7. Create User Story 307: A user story is a unit of application feature, and comprises a series of UI screens containing UI widgets arranged in a sequential manner, associated business rules for each UI screen, integration points connected to UI screens.
8. User Interface set up 308: Allows users to specify the user interface elements (referred to as widgets) associated with a user interface that is a part of the user story workflow
9. User Interface mockup set up 309: The UI screen mockup is created using the UI builder tool provided by the system
10. Business Rules set up 310: Allows users to specify business rules associated with a user interface screen
11. Integration Point set up 311: Allows users to define integration points between a user interface screen and other, external applications
12. Interface set up 312: Allows users to define integration interfaces that represent individual invocation operations
13. Data fields set up 313: Allows users to specify data fields associated with an integration interface specification
14. Business Rules set up 314: Allows users to specify business rules associated with an integration interface Each of the above items is covered in detail in the following sections. Beyond the requirements and design specifications, the system also addresses automated effort estimation, automated test case generation, automated story card and task generation, managing the lifecycle of story cards, defect management, defect predictive modeling, mobile application access, automated email notifications, text search capability, collaboration tools and more.

The User Story Workflow Visualization

Figure 4:
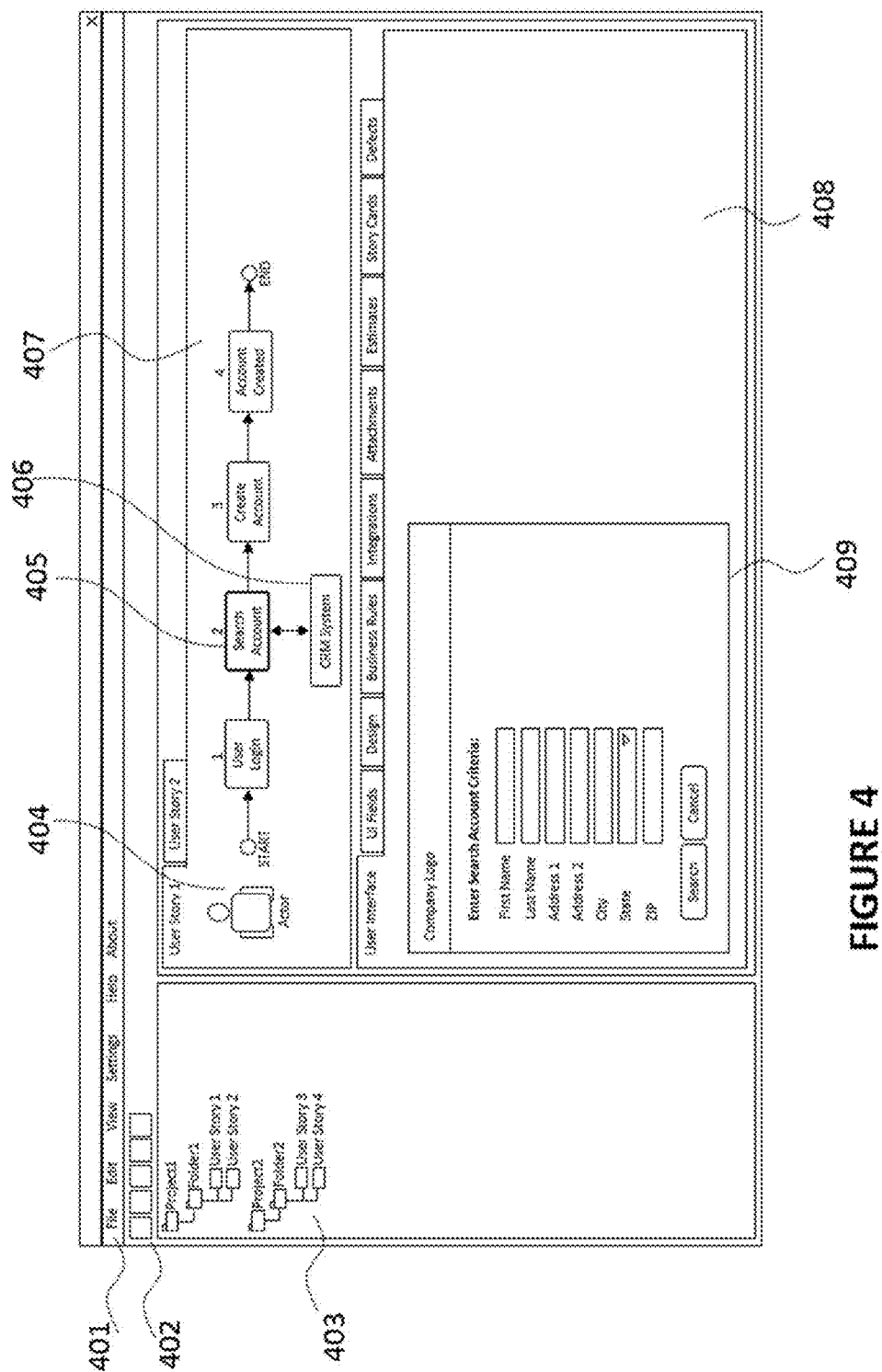
FIG. 4 is an exemplary graphical user interface of a standard user story workflow in accordance with the present invention.

FIG. 4 illustrates the user story workflow visualization. A user story is a common tool used to translate user requirements into programming tasks. The user story is a mechanism used to capture a description of a software feature from an end-user perspective. The user story describes the type of user (the actor) and what they are trying to accomplish with the application, and helps to create a description of a requirement. The workflow visualization tool allows users to build user stories within the product. The workflow is visually depicted as a process flow with sequential steps. Each of the steps corresponds to a User Interface screen in the application being specified. Each of the steps also has the associated business rules, table view of UI widget and integration points. The system also provides the ability to re-use the steps across various user stories. This reflects a need from how software applications are typically structured—they often have user interface screens that are common to a number of workflows.

The individual elements on FIG. 4 are described as follows:
1. Main Menu Bar 401: Main Menu Bar allows users certain administrative functions such as set up custom data fields, user administration, administrative data set up, as well as set up of design patterns and user interface style sheets
2. Main Tool Bar 402: Main Tool Bar allows users high level functions such as creating a new Project, a new Folder, a new User Story, playback of User Story
3. Navigation Tree 403: Allows users to navigate the Projects, Folders and User Stories using a tree structure that allows for expanding and collapsing nodes
4. User Story Actor 404: The actor is the end user who drives a user story from start to finish. For example, a customer service representative may create a new customer account. The customer service representative is the actor.
5. User Story Step 405: The User Story step represents a UI screen as a step in the process flow associated with the user story.
6. User Story Workflow Depiction 407: A visual, process flow chart-like view of the user story workflow, with a sequence of user interfaces that describe the page flow.
7. User Story Step Details 408: A tabbed pane that shows a number of details associated with a step in the user story—such as the user interface, user interface fields (also referred to as widgets), business rules, effort estimates (calculated automatically), story cards, defects, discussions and related history.
8. Integration Point Visual Depiction 406: Represents the integration point that connects a UI screen of the software application to another external application, through the user interface described on the step
9. User Interface Visual Depiction 409: Represents the visual rendering of the User Interface associated with a step in the User Story. This rendering is a combination of an image and overlaid rendered widgets.

One advantage of this method is the ability to visually set up integration points that are automatically linked with User Interface screens. These integration points represent the application integration between the application being defined and other external systems. Such integrations are required to retrieve data that resides in other applications (for example, to retrieve credit scores for a customer for whom a loan application is being evaluated). Such integrations may also be required to notify other dependent, downstream applications regarding transactions of interest in the system being developed.

The User Interface Specification

Figure 5:
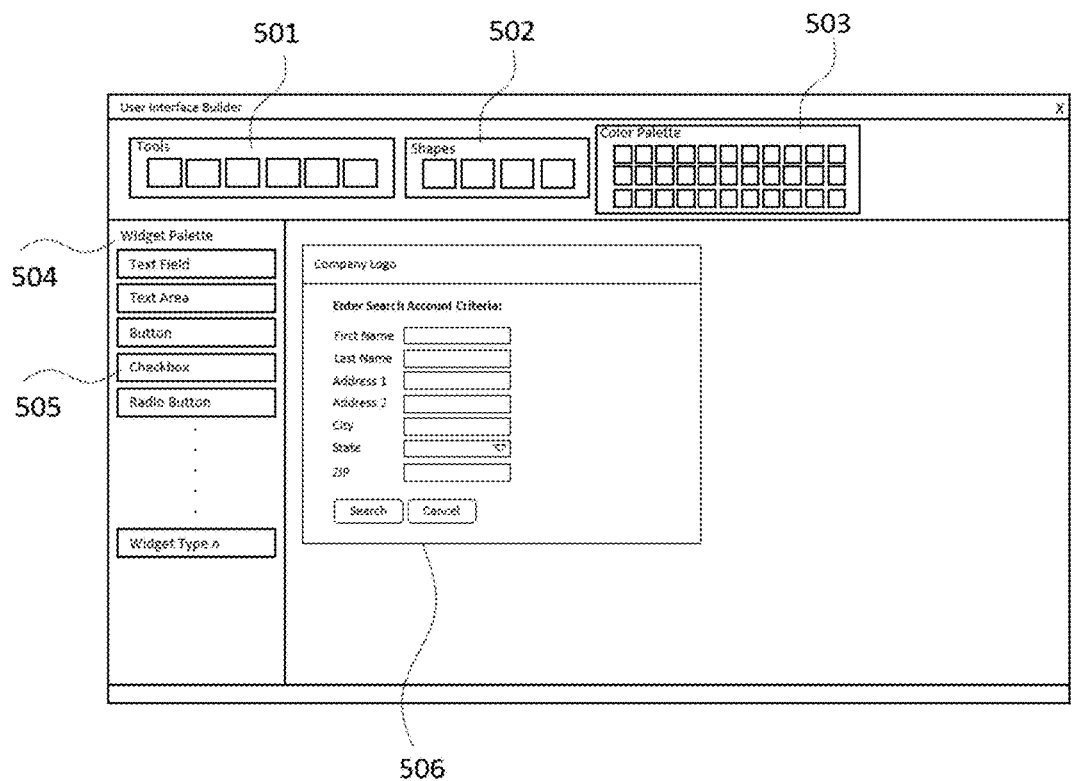
FIG. 5 is an exemplary graphical user interface showing how the detailed information for the user interface comprising of user interface widgets in the user story workflow is created in accordance with the present invention.

Referring to FIG. 5, the user has the ability to setup the user interface specification with constituent UI widgets and associated attributes. The associated attributes for the UI widgets include label text, appearance, visibility rules, editability rules, other business rules, type of underlying data in database, and other information necessary to develop such a user interface in a software application.

Users can specify the background image associated with a user interface. Users can pick an image file from the local computer and then assign to the user interface for the user story step. When the user story is persisted on the server, the image then persisted on the server and is then visible to all the users who are able to see the user story. The background image can be used to incorporate the company logo and other static style elements. On top of the background image, users can then define user interface widgets. The user interface definition is thus a combined rendering of an image, overlaid with the UI widgets. The UI widgets are rendered using a specialized method of programming that allows the program access to the underlying graphics rendering engine. Using programming logic, the system is then able to graphically render various types of UI widgets. Users can also edit areas of the image by using the "Shapes Palette" feature of the UI builder (as shown in FIG. 5, element 502). This allows the users to edit the image portion of the UI specification, while retaining the UI widgets. The system automatically updates and persists the edited image (by overlaying the shape rendered on top of the image) and related metadata in the server database.

The individual elements on FIG. 5 are described as follows:
1. Widget Manipulation Tools 501: Allows users to delete selected widgets, copy and paste selected widgets, align widgets horizontally or vertically, pick color from an image, apply style attributes to selected widgets, format selected widgets.
2. Shapes Palette 502: Allows users to draw shapes such as lines, rectangles which are then rendered on the UI specification as additional drawing items
3. Color Selector Palette 503: Allows users to set the current color selection which is then used for the drawing shapes or also for setting the style on a group of selected widgets.
4. Widgets Palette 504: Allows users to create new widgets from the pre-defined selection of widgets. Once a widget is created, it can dragged to a new location or edited otherwise.
5. Individual Widget Button 505: Allows users to add a new UI widget of a particular chosen type from the palette of available types.
6. UI screen rendering 506: Shows the visual rendering of the UI screen, allowing users to select one or more widgets using mouse controls, double-click to edit widgets.

User Interface Style Sheets Specification with "Real-time" Rendering

The system allows the ability to set up User Interface Style Sheets. A user interface stylesheet is a centralized and common definition of the style elements associated with the look and feel of a user interface. These include fonts, font sizes, text colors, widget line colors, background colors, button size, rounding, gradient colors, spacing between widgets and more. Once a UI style sheet is defined and associated with a Project, the same consistent look and feel is automatically applied across all the user interface specifications used in all the user stories defined as part of the project. This results in consistency and accuracy, as well efficiency gains as the user does not have to worry about or select the style elements for each UI widget individually. A unique ability of the tool is to render the style sheet in a real-time manner, as users change the style attributes in the style sheet editor wizard, the system renders the style sheet updates in a real-time fashion without any delays. This allows for quicker feedback and a more intuitive user experience.

The individual elements on style sheets wizard are described as follows:
1. Style sheets list: Allows users to see the list of style sheet configured. Users can create new style sheets, edit or delete existing stylesheets.
2. Style Controls: Shows how users can configure the various style attributes associated with a style sheet
3. Style sheet visual rendering: Shows a rendering of the style sheet as users adjust the style controls—such a rendering is "real time"—as users are adjusting the style controls, the rendering is updated in a "real time" manner The System also allows set up of Project Planning details for a User Story step. This comprises of selecting which development sprint (or iteration) this User Story Step will be worked on—for the four key work items—requirements definition, design, development and testing. The project planning tab on the User Story Step wizard allows project managers to schedule out the timing of when these tasks will be done. This is another area where the present invention brings together the project management aspects of the software development process with the requirements specification.

The system also has the ability to render UI widgets dynamically on the UI specification screen—to specify dynamic display behavior of the software system you are trying to build. Such dynamic display of UI widgets is required in situations where the application being developed has such a behavior and being able to visualize such dynamic display features in this system allows all the users to quickly visualize and understand the dynamic display. When certain widgets appear or disappear based on the value or selection of another widget, these widgets are said to have "dynamic display". For example, if a user checks a check box (defined as the "driving widget"), a number of widgets may appear below the check box to collect further information from the user. Such dynamic display behavior can also be driven by a radio button or a dropdown box. Such dynamic display capability is not possible to be described or specified with the traditional tools of UI requirements definition. The user can choose which other widget (the driving widget) causes the instant widget to appear or disappear, and select different behaviors depending on the value of the driving widget.

Business Rules Specification for the User Interface

The system provides the ability to define business rules associated with a User Interface and optionally with a UI widget. Such business rules can be defined with deep, nested hierarchies that allow flexibility. Business Rules are a critical aspect of the requirements specification for a software application. Business Rules allow users to specify more sophisticated and specialized behavior of the application that is not directly visible from the UI screen specification alone. Such rules, for example may dictate how the system behaves when users enter certain invalid data on the screen. Such rules may dictate how the system behaves when external systems with which this system is supposed to interact with, may be not available. Such rules dictate system behavior when a particular combination of data is entered, or a particular combination of data is encountered by the system. Indeed, there is no limit to the types of business rules that users may come up with to describe the system they wish to build. The present invention allows for a systematic and flexible approach to defining business rules associated with a UI screen. Business Rules are defined using an—IF (condition) THEN (action) type of a syntax. This allows for a clear and unambiguous definition of what the system is supposed to do when encountering a particular condition. Business Rules are grouped under Business Rule Groups. Business Rule Groups can be thought of as "folders" or containers that contain business rules. Business Rule Groups allow Business Rules that are similar or logically related, to be grouped under a single parent container. Such grouping not only has the advantage of logical clarity, it allows for the Business Rule Groups to be shared and re-used across many user stories. Business Rule Groups are also hierarchical (or "nested") in structure—meaning Business Rule Groups can consist of Business Rule Groups and so on. Such a nested structure allows for more flexibility in defining a deep hierarchy. Business Rule Groups can be associated with an entire User Interface screen, or an individual widget on a User Interface screen, allowing for further flexibility. Business rules can also be defined for integration interfaces, as will be described later in this disclosure.

Set up of Design Patterns

Figure 6:
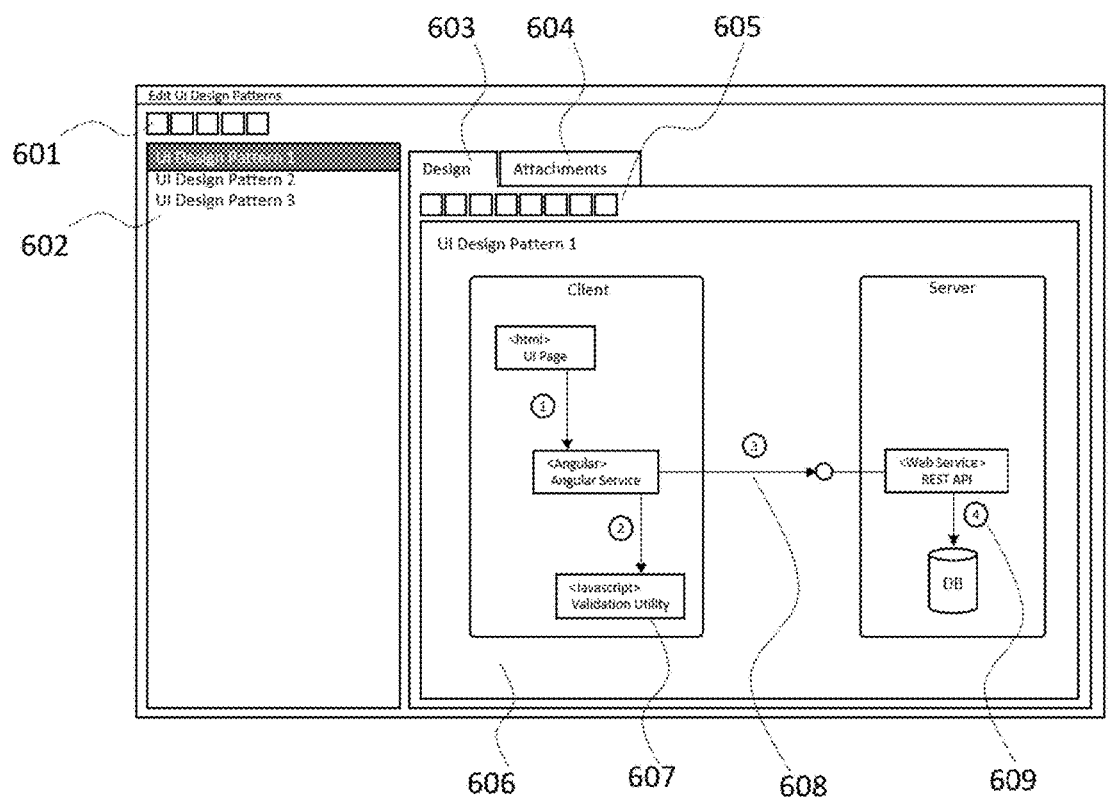
FIG. 6 is an exemplary graphical user interface showing how UI design patterns are set up in accordance with the present invention.
Figure 7:
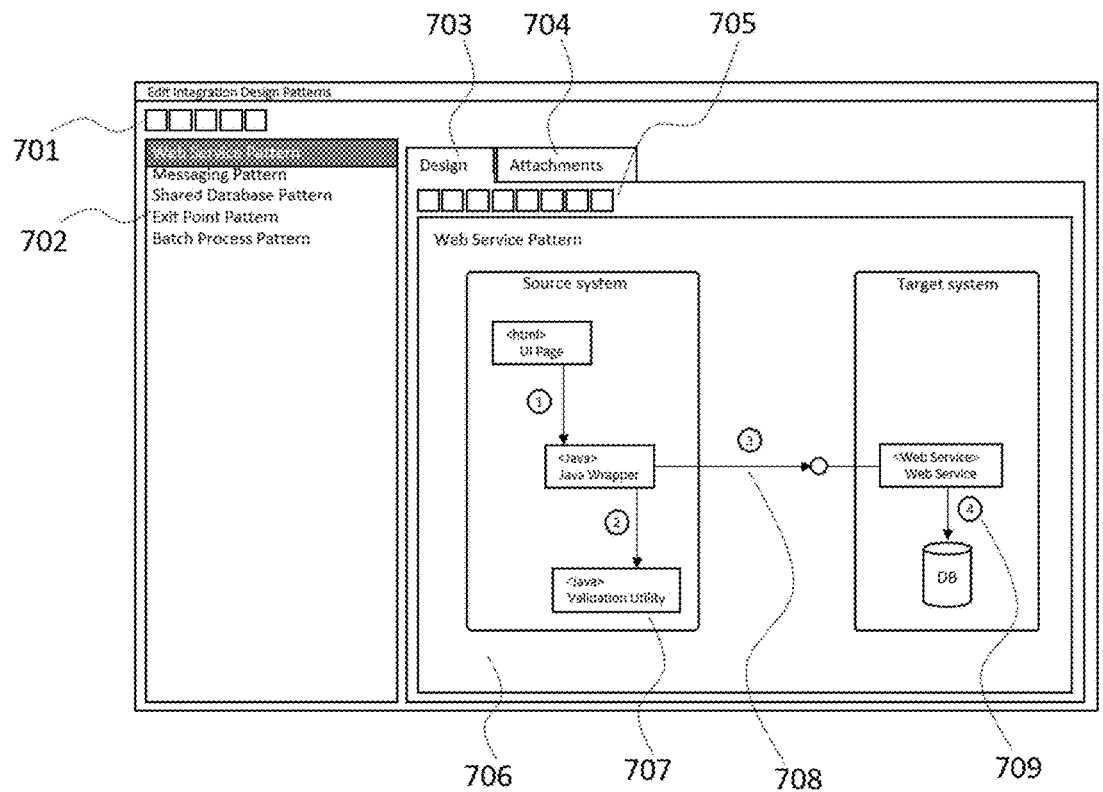
FIG. 7 is an exemplary graphical user interface showing how integration design patterns are set up in accordance with the present invention.

The present invention provides the ability to set up technical design patterns using a Graphical Aid (FIGS. 6 and 7). Design Patterns allows users to create re-usable, standardized solutions to apply to application feature UI development and integration interface development. Design patterns are sometimes also referred to as "Architectural Patterns". These two terms are used interchangeably in the context of the subject disclosure. There are two types of design patterns supported by the system, UI design patterns applicable to UI application features (which includes both the client and server side design components), and for Integration Interfaces (which includes source system and target system design components). The design patterns are visual depictions of the component level solution architecture, showing various design components and how they interact programmatically. The goal of the design pattern is to provide sufficient level of technical details in directing a developer to write the code to build the application features and integration interfaces.

FIG. 6 shows the details of this capability for defining UI Design Patterns, including client and server systems, design components, program flow steps (which describe the program flow), arrows that depict program flow, web service end points, database components, and effort estimates associated with each of the component (this includes fixed effort estimate and variable effort estimate per data field). The UI design pattern consists of the following constructs.

Client Side: The client portion of the application

Server Side: The server portion of the application receives and processes the client side invocation Design Components: Represents a programming or application module within the source or target system that performs a specific duty.

Program Flow Step: Represents the logical flow of the programming logic for the client-server invocation. It includes a step number (the sequence number) and a brief description of the step.

Arrows: These represent program invocation between the various design components when programming logic dictates such a transfer of the program flow A brief description of each of these elements on FIG. 6 is as follows:
1. Main Toolbar 601: Allows users to create and delete patterns
2. Design Pattern List 602: Displays the list of all the patterns defined
3. Design Tab 603: Displays the design manipulation screen
4. File Attachments Tab 604: Allows users to attach files to patterns
5. Design Pattern Builder Toolbar 605: Allows users to add new design components, arrows and sequence steps to the design pattern
6. Design Diagram Rendering 606: Computer generated design pattern diagram
7. Design Component Rendering 607: Computer generated rendering of a design component that shows the type and name associated
8. Program Invocation Arrow 608: Computer generated arrow indicating program logic transfer
9. Program Flow Sequence Step 609: Represents a program flow sequence step for the integration program logic FIG. 7 shows the details of this capability for defining Integration Design Patterns, including source and target systems, design components, program flow steps (which describe the program flow), arrows that depict program flow, web service end points, and effort estimates associated with each of the component (this includes fixed effort estimate and variable effort estimate per data field). The integration pattern consists of the following constructs.

Source System: The system that initiates the interface invocation

Target System: The system that receives and processes the interface invocation

Design Components: Represents a programming or application module within the source or target system that performs a specific duty.

Integration Flow Step: Represents the logical flow of the programming logic for the integration invocation. It includes a step number (the sequence number) and a brief description of the step.

Arrows: These represent program invocation between the various design components when programming logic dictates such a transfer of the program flow Web Service End Points: Represents a web service end point that provides a specific business functionality (for example to retrieve a weather forecast for an address, or retrieve credit score for a customer)

A brief description of each of these elements on FIG. 7 is as follows:
1. Main Toolbar 701: Allows users to create and delete patterns
2. Design Pattern List 702: Displays the list of all the patterns defined
3. Design Tab 703: Displays the design manipulation screen
4. File Attachments Tab 704: Allows users to attach files to patterns
5. Design Pattern Builder Toolbar 705: Allows users to add new design components, arrows and sequence steps to the design pattern
6. Design Diagram Rendering 706: Computer generated design pattern diagram
7. Design Component Rendering 707: Computer generated rendering of a design component that shows the type and name associated
8. Program Invocation Arrow 708: Computer generated arrow indicating program logic transfer
9. Program Flow Sequence Step 709: Represents a program flow sequence step for the integration program logic Once design patterns have been defined for the UI and Integration Interfaces, users can select the applicable design pattern when defining a UI screen or an integration interface, allowing for re-use, consistency and standardization of technical designs.

Integration Points Specification

Another important aspect of developing software applications is how they integrate with other applications (both internal and external to the enterprise). These integration points represent the application integration between the application being defined and other external systems. Such integrations are required to retrieve data that resides in other applications (for example, to retrieve credit scores for a customer for whom a loan application is being evaluated). Such integrations may also be required to notify other dependent, downstream applications regarding transactions of interest in this system. Such integration points logically consist of a "source system" (the system that originates the integration message or invocation), a "target system" (the system that receives the message or invocation and handles it appropriately) and a number of "integration interfaces" that connect the source and target systems.

The present invention provides the ability to systematically define integrations points. Before you can create integration points and integration interfaces, you need to first set up integration design patterns in the system. Integration Design Patterns are common solutions to recurring problems—they allow you to specify how certain integrations can be accomplished from a system architecture and design perspective. They provide a guideline for solving a class of integration problems. For example, you may define a "Web Service Integration Pattern" to tackle synchronous invocation of a web service end point that another application (the "target" system) exposes as a business interface. Yet another pattern could be "Message Queue Integration Pattern" to asynchronously notify a target system of an event or transaction of interest in the source system. An Integration Design Pattern consists of a detailed architectural description that includes design components and how they interact together programmatically. Using Integration Design Patterns as an architectural method has several advantages—consistency and accuracy (you are solving the similar problems with proven, well known solutions), economies of scale (you are able to re-use the same pattern over and over again) and standardization (you are creating a standards based approach to integrations).

The system allows a user with minimal technical knowledge to set up an Integration Point specification which further comprises of Integration Interfaces that allow you to specify how the current system under development interfaces with other, external systems using various integration methods. The ability of non-technical users (such as requirements analysts, business analysts or business team) to define and set up requirements for integration interfaces is a key benefit of the system. With integration design patterns already established by the architects, it is possible for these non-technical users to also be able to generate an Integration Design Document from this system automatically.

The system also allows project managers to specify the planned sprint (or iteration) for a particular interface. This comprises of selecting which development sprint (or iteration) this interface will be worked on—for the four key work items—requirements definition, design, development and testing. The project planning tab on the Integration Interface wizard allows project managers to schedule out the timing of when these tasks will be done. This is another area where the present invention brings together the project management aspects of the software development process with the requirements specification.

The present invention allows users to automatically set up Integration Interfaces by importing the previously defined definition of a web service endpoint in a Web Service Description Language (WSDL) document. A WSDL document may exist in some cases and this additional method of setting up interfaces provides additional ease of use, consistency and accuracy. The system will not only automatically create the interfaces and also set up the integration data fields associated with each interface. The system will automatically populate certain attributes of the data fields such as field name, data type, required or not, whether part of a request or response. This reduces effort for the end users, while also improving accuracy.

Figure 8:
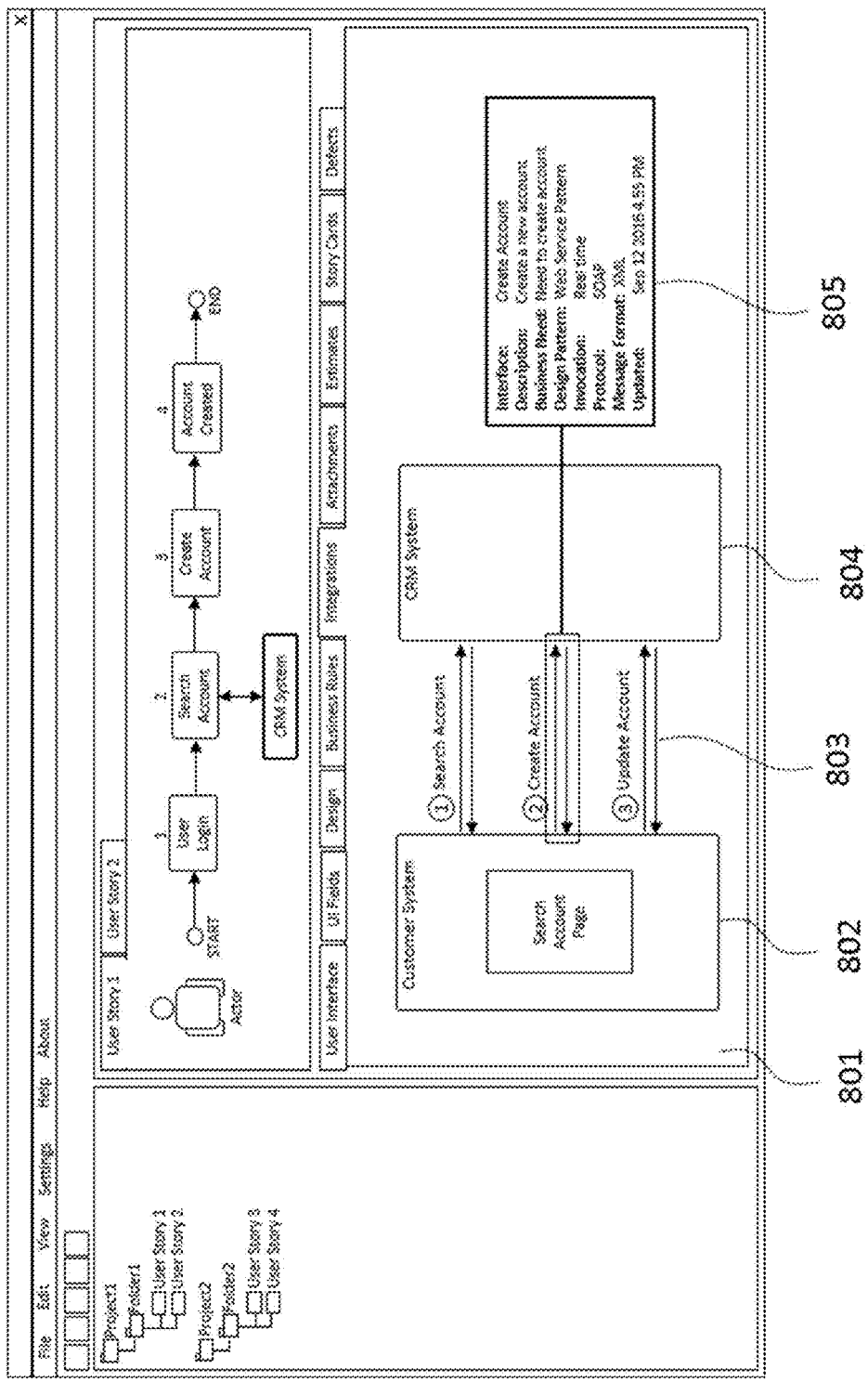
FIG. 8 is an exemplary graphical user interface showing how integration points and interfaces are set up in accordance with the present invention.

FIG. 8 shows the ability to render the Integration Point visually by depicting the source and target systems, and the constituent integration interfaces.

Figure 9:
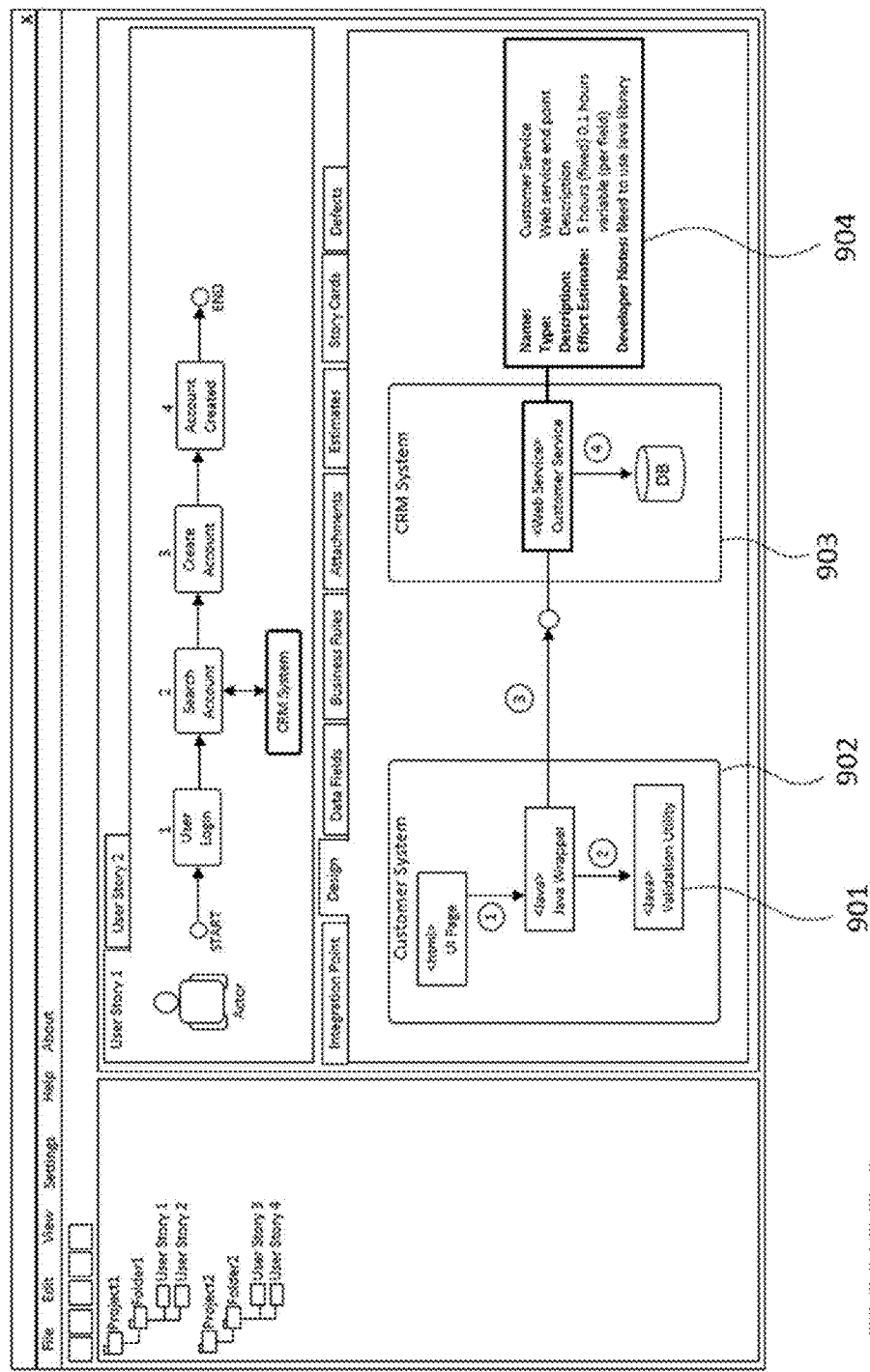
FIG. 9 is an exemplary graphical user interface showing how integration points and interfaces design is rendered in accordance with the present invention.

A brief description of each of these elements on FIG. 8 is as follows:
1. Visual Rendering of Integration Point 801: Shows a visual rendering of the integration point with its constituent integration interfaces
2. Source System 802: Source system depicts the system that initiates the interface invocation
3. Integration Interface 803: Depicts the integration interface between the source and target systems and represents a unique operation (for example—get credit score for a customer)
4. Target System 804: Target system depicts the system that receives the interface invocation
5. Interface Metadata display on "mouse over" 805: When the user positions the mouse cursor over an interface, the systems displays a number of details regarding the interface such as description, business need, user who created it, user who modified it, date created, date modified, defects if any FIG. 9 shows the ability to render the technical design for an Integration Interface by re-using and merging the metadata specific to the interface with the metadata pattern elements of the design pattern. The merging of the pattern metadata, such as the source and target system names and the interface name, with the actual instance of an integration interface is a key element of the present invention, and enables the rendering of the integration interface design by re-using the integration pattern definitions across a wide variety of interfaces.

A brief description of each of these elements on FIG. 9 is as follows:
1. Design Component 901: Depicts the design component associated with the integration design. Such a design component represents a programming module with a distinct responsibility in the integration program logic flow
2. Source System 902: Source system depicts the system that initiates the interface invocation
3. Target System 903: Target system depicts the system that receives the interface invocation
4. Design Component Metadata display on "mouse over" 904: When the user positions the mouse cursor over a design component or flow sequence step, the systems displays a number of details regarding the component such as description, developer notes, estimates Data Fields Set Up for Integration Interfaces The system provides the ability to specify data fields associated with an integration interface. Data fields are a critical part of the requirements specification for integration interfaces. They specify the interface contract—i.e. what data fields are going to be sent in the request and what data fields shall be returned in the response of the interface invocation (for a synchronous, response-response type of an interface invocation). For example, to retrieve credit score for a customer, the request may consist of customer name and address, while the response may consist of a credit score. The system allows users to specify detailed information regarding the data fields, including the ability to specify data-mapping between the source and target systems. Such detailed information consists of—field name, data type, description, required or not, whether part of request or response, default value, source data entity and field name, target data entity and field name. The Data Field set up user interface further helps the users by narrowing down data types to a drop down list (instead of a free form text in traditional tools), check box for yes/no type of values. The system also tracks metadata associated with the data fields such as date created, date modified, user who modified and more. Further, the system also assigns a version number for each incremental change to a data field. Such versioning capability allows for incremental development by identifying what data fields were modified in a given iterative development cycle.

The system also provides the ability to view changed data fields in a given timeframe—with color coded visual aid for identifying changes overlaid on the data mapping fields' specification. Such an ability to view changed data fields in a given timeframe has the advantage of quickly identifying to a the user what elements of interface specification (data fields, which are a part of the interface specification) were modified in a given timeframe (such as an hour, a day, a week, a month, a sprint in an Agile methodology or even a custom defined time period with a start date and end date). As noted above, the ability to visually identify incremental changes is a key enabler of incremental, iterative development process that constantly builds incremental features using an iterative approach. This allows various involved parties (such as requirements analysts, business analysts, architects, developers, testers etc.) to all have a single, consistent and accurate view of requirements with an incremental tracking capability with visual aid.

Business Rules Specification for Integration Points

The system provides the ability to define business rules associated with integration points. Business rules for integration points could describe trigger rules, validation rules, business logic rules, error handling rules and more.

Such business rules can be defined with deep, nested hierarchies that allow flexibility. Business Rules are a critical aspect of the requirements specification for a software application. Business Rules allow users to specify more sophisticated and specialized behavior of the application that is not directly visible from the UI screen specification alone. Such rules, for example may dictate how the system behaves when users enter certain invalid data on the screen. Such rules may dictate how the system behaves when external systems with which this system is supposed to interact with, may be not available. Such rules dictate system behavior when a particular combination of data is entered, or a particular combination of data is encountered by the system. Indeed, there is no limit to the types of business rules that users may come up with to describe the system they wish to build.

The present invention allows for a systematic and flexible approach to defining business rules associated with a UI screen. Business Rules are defined using an—IF (condition) THEN (action) type of a syntax. This allows for a clear and unambiguous definition of what the system is supposed to do when encountering a particular condition. Business Rules are grouped under Business Rule Groups. Business Rule Groups can be thought of as "folders" or containers that contain business rules. Business Rule Groups allow Business Rules that are similar or logically related, to be grouped under a single parent container. Such grouping not only has the advantage of logical clarity, it allows for the Business Rule Groups to be shared and re-used across many user stories. Business Rule Groups are also hierarchical (or "nested") in structure—meaning Business Rule Groups can consist of Business Rule Groups and so on. Such a nested structure allows for more flexibility in defining a deep hierarchy.

In the same manner described in FIG. 9, UI screens are associated with UI design patterns and the resulting technical design is rendered for each UI screen as well. The UI design patterns shows the design for a client-server invocation mechanism rather than a source-target system invocation for an integration interface.

Audio-video Playback of a User Story Workflow

Figure 10:
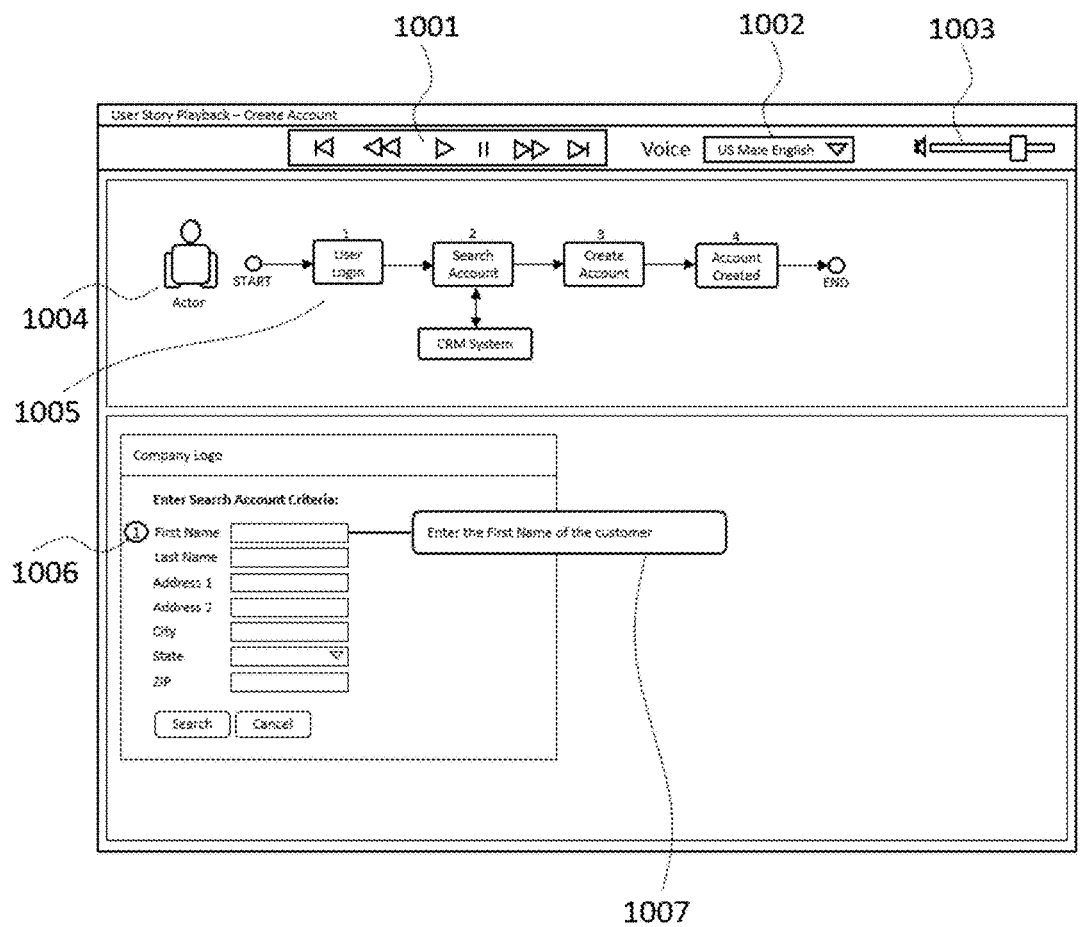
FIG. 10 is an exemplary graphical user interface showing how the text to be spoken in the user story audio-visual playback is specified in accordance with the present invention.

The present invention provides a novel ability to playback a user story in an audio-video format that plays out the entire end user interaction with the software application. Such a playback consists of: (FIG. 10)

1) A computer-generated voice prompt for each user interaction that describes how the user interacts with the application (this voice content is controlled by the text entered in the requirement specification that is defined in the system)
2) A text callout pop-up that also displays the voice content (in text format) and a step number associated with the UI widget
3) Navigation through the various UI screens, much in the same way an end user would navigate the software application
4) Ability to "pause" at the particular step in the User Story
5) Ability to skip to next step or last step, or go back to previous step or first step (this is similar to "rewind", pause, play, and fast forward functions)
6) Ability to change the voice accent (e.g. American male, British female etc.) to aid further in easy comprehension of the voice prompt There are multiple advantages of the above mentioned "audio-visual" playback method, as described below.

The audio-visual playback helps visualize the end user interaction with the system exactly how the end user would. It leaves very little room for interpretation or room for human errors to creep in the "interpretation" of requirements that may be otherwise specified using plain text (or even with the aid of some diagrams).

It address the "workflow" of the user story in a superior method—screen by screen and widget-by-widget along with voice prompts that clearly articulate how the user interacts with the system. Such a system is far superior to describing this interaction in a document with text and pictures. The voice prompts (converted from the playback text entered by the users as part of the requirement specification) add a second dimension of articulation that further reinforces the visual animation of the user story. These voice prompts are a great way to explain subtle nuances associated with the requirements. These voice prompts along with the text popups provide a more engaging and interesting media for user consumption.

The playback capability has the ability to pause, rewind and fast forward the playback itself, allowing for further control over the content—allowing users to dwell deeper on certain steps of the playback and pause for discussion and brainstorming.

It provides a far more superior method of brainstorming new product ideas or concepts as you are able to visualize the user story workflow in a far more realistic setting, much closer to how the end user would interact with the system.

It provides the ability for user to change the voice accent to a local language accent—allowing for enhanced assimilation of the content and localization of the content depending on where you are located in the world (for example team members based in the UK might prefer the British English accent, which further enhances their understanding and interpretation).

It is a useful tool for remote or distributed teams—allows them all to visualize the content when and how they want, in the local accent they want.

It provides an excellent means to train and educate the internal staff, operations, support staff, production support staff, end users and even customers It provides an excellent means to gather feedback from customers on the new product features or updates to product features (in essence well before the product is developed, when the customer feedback is most valuable)

The individual elements on FIG. 10 are described as follows:
1. Playback Controls 1001: These controls allow the user to control the playback, such as pause, rewind, fast forward, resume
2. Playback Voice/Accent Control 1002: This allows the user to select from a pre-defined drop down list of voice accents (for example US Male, UK Female)
3. Volume Control 1003: Allows the user to adjust the audio volume of the computer
4. User Story Actor 1004: Shows the actor (end user) who drives the user story
5. User Story Workflow 1005: Shows the step-by-step sequence of user interfaces for the user story
6. Playback Sequence Step Display 1006: Displays the numerical step associated with the widget being described by the voice prompt
7. Playback Text Display 1007: Displays the playback text in a text format (the same text gets converted to voice in the voice prompt)

Users specify the playback text and whether playback is enabled for a widget using the widget wizard screen. The descriptions entered for a User Story and User Story Step (in the set-up of the User Story workflow) are also incorporated in the overall playback of the user story, in addition to the playback text for selected widgets.

View Changed Widgets

Figure 11:
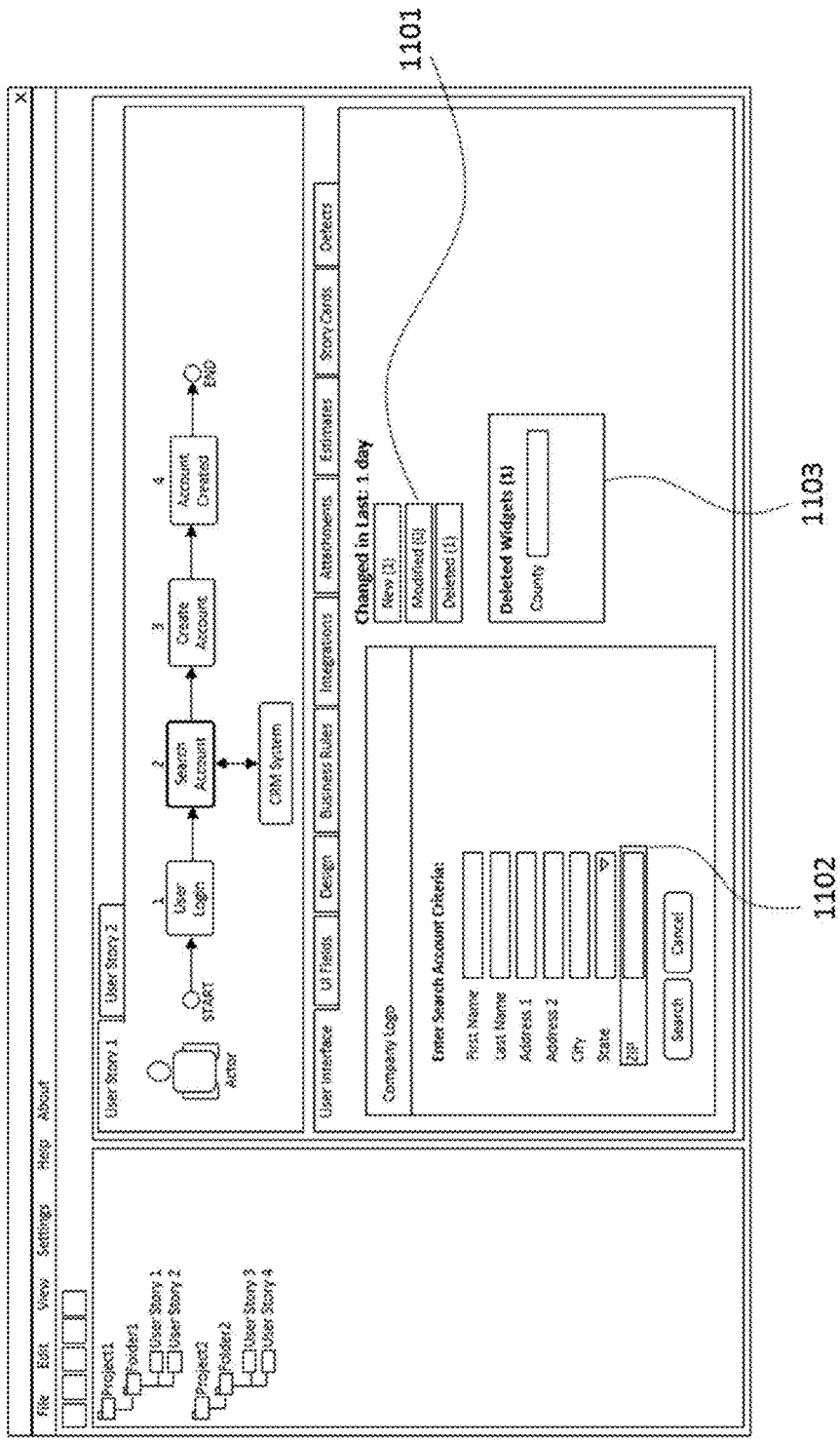
FIG. 11 is an exemplary graphical user interface showing how user interface widgets that are changed are visually depicted in accordance with the present invention.

Referring to FIG. 11, the system provides the ability to view changed UI widgets in a given timeframe (1)—with color coded visual aid for identifying changes overlaid on the UI specification (1). Such an ability view changed widgets in a given timeframe has the advantage of quickly identifying to the user what elements of the UI specification were modified in a given timeframe (such as an hour, a day, a week, a week, a sprint in an Agile methodology or even a custom defined time period with a start date and end date).

The individual elements on FIG. 11 are described as follows:
1. Changed items visual depiction 1102: Allows users to see the changed items (widgets) on the User Interface specification. These changes are highlighted with a color coded visual aid for new/modified/deleted widgets.
2. Changed items summary legend 1101: Shows a summary of statistics of all the changed items in the selected timeframe
3. Deleted widgets 1103: Shows a separate visual rendering of the widgets deleted from the screen as part of the requirements definition process. The depiction of deleted UI widgets is critical in understanding the incremental changes to UI requirements. Having the deleted widgets rendered separately without interfering the regular UI screen, allows a more effective and visual way of communicating the deleted widgets. Such a capability is difficult to achieve with traditional tools of documentation.

The ability to visually identify incremental changes is a key enabler of incremental, iterative development process that constantly builds incremental features using an iterative approach. This allows various involved parties (such as requirements analysts, business analysts, architects, developers, testers etc.) to all have a single, consistent and accurate view of requirements with an incremental tracking capability with visual aid, resulting in a far superior method of communicating changes in the application.

View Widget Metadata

Figure 12:
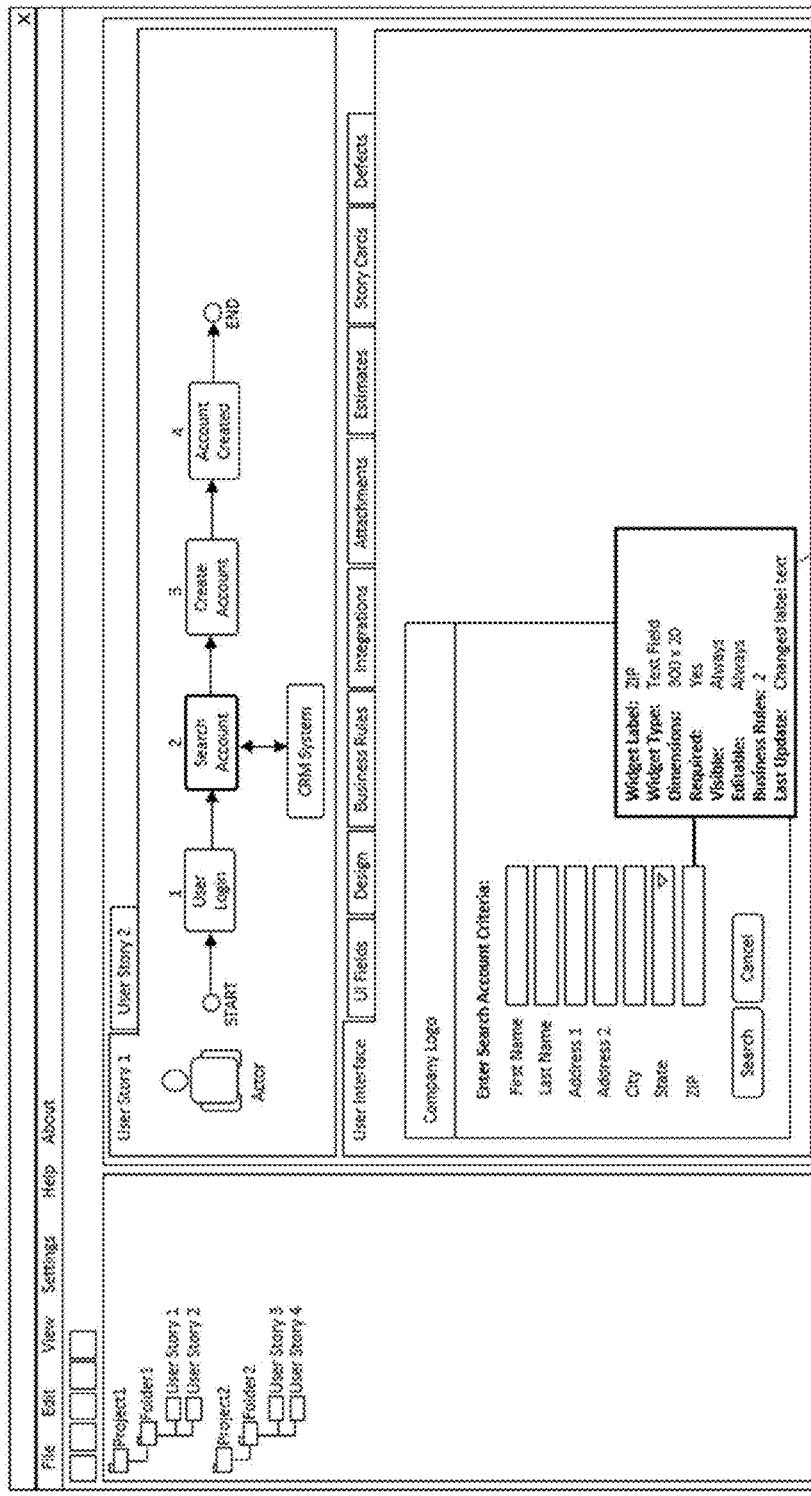
FIG. 12 is an exemplary graphical user interface showing how metadata attached to each widget in a user story is displayed in accordance with the present invention.

Referring to FIG. 12, the UI specification tool has the ability to view detailed metadata information about a UI widget when the user positions the mouse cursor over the widget. Such metadata includes type of widget, date created, date modified, user who modified, the last modification made, the data type, visibility and editability rules (visibility rules specify what types of users can see this widget and under what conditions, while editability rules specify what types of users can edit this widget, and further, under what conditions), other business rules, and defects associated with the widget. The ability to view detailed metadata about the UI widget as the user positions the mouse over it, allows the user to view a lot more information about the UI widgets than what is normally visible on the screen. This has the advantage of packing a lot more data on a small physical screen area, and showing the details to the user "on demand", i.e. when the user desires the additional details to be displayed. This method has the advantage of hiding detailed data when not needed, and showing the details when needed. This creates a more intuitive and user friendly experience for the user of the system.

The individual elements on FIG. 12 are described as follows:
1. Widget metadata display on "mouse over" 1201: When users position the mouse over a particular widget of interest, the popup display shows the details of the metadata associated with the widget The ability to view details on "mouse-over" has been provided for multiple items in the system. Users can view details on mouse-over for a User Story Actor, User Story Step, UI Widget, Integration Interface, Design component, Program Flow Step, Story Cards.

View Defects on User Story

Figure 13:
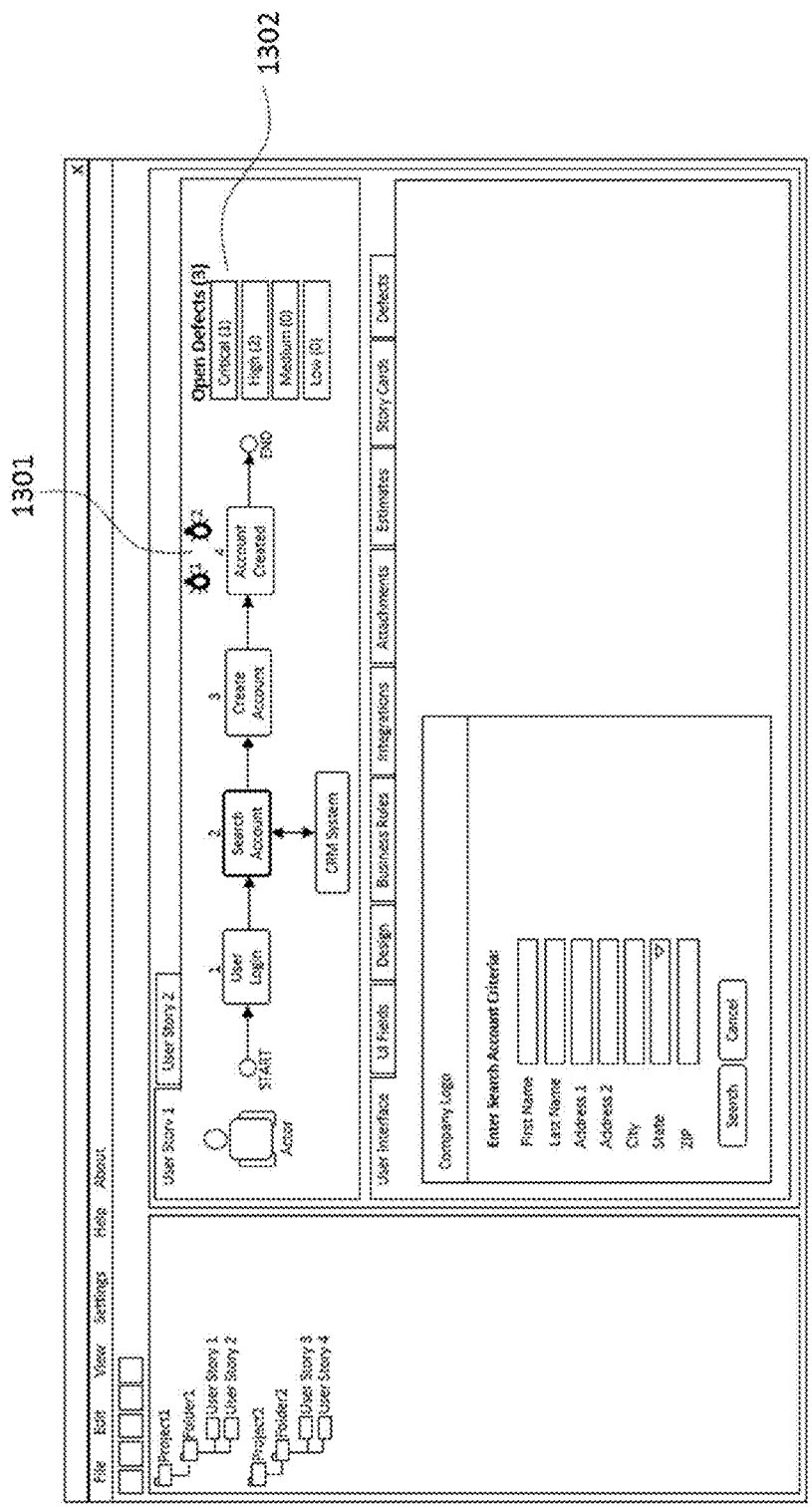
FIG. 13 is an exemplary graphical user interface showing defects at the user story level in accordance with the present invention.

Once testing of the application gets underway and defects are discovered and reported in this system, users can visually view defects on the User Story workflow. FIG. 13 shows such depiction of defects, with which step they are associated, and the color-coded defect summary. The defect summary legend shows the summary of all the defects on the User Story workflow, with a breakdown by defect severity.

Figure 14:
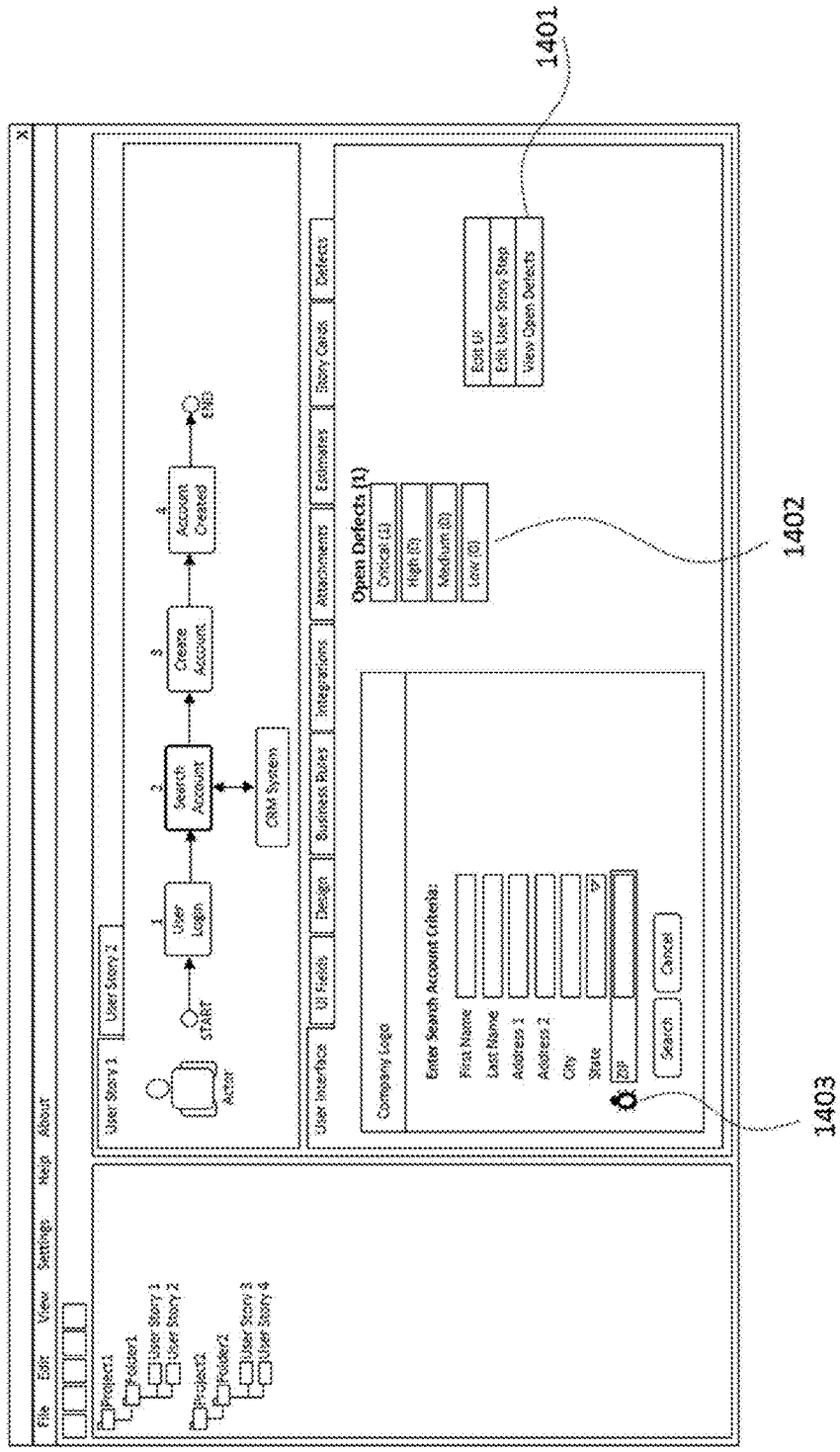
FIG. 14 is an exemplary graphical user interface showing defects at the UI widgets level in accordance with the present invention.

The individual elements on FIG. 13 are described as follows:
1. Defects Visual Depiction 1301: Allows users to visually identify the defects associated with each of the steps of the User Story workflow. This includes defects on the user interface as well as defects on the integration interfaces. Such a visual depiction is color coded for defect severity and also shows the total number of defects for each severity type
2. Defect Summary Legend 1302: Shows the summary statistics of all the defects on the User Story workflow, with a breakdown by defect severity Visual Depiction of Defects on User Interface FIG. 14 shows the ability to visually depict defects on the UI specification with a graphical overlay and color coded visual aid. This has the advantage of showing the software defects "side by side" with the UI requirements specification. Such a "side by side" graphical view of defects alongside the UI requirements "ties together" the defects with the requirements—such an association is fundamentally important to the software development process because requirements specifications are the source of truth against which defects are written. The ability to graphically depict the defects on the UI widgets provides a level of detail and context that is currently lacking in the tools used today. These defects are also visually color coded for defect severity, this further aids in quick identification of the defect severity on any given UI screen. This creates an enhanced user experience that allows for quick and accurate identification of software quality of a UI screen that is being developed.

The individual elements on FIG. 14 are described as follows:
1. Right click menu to view open defects 1401: Shows how the users initiate the view defect menu option by right-clicking on the screen
2. Defect Summary Legend 1402: Shows a summary view of the defects statistics, broken out by defect severity
3. Defects Visual Depiction 1403: Allows users to see the defects visually overlaid on the user interface specification. These defects are also color coded for severity. When users position the mouse over the widget, they can also see further details of the defects such as a short headline summary.

Visual Depiction of Defects on Integration Interfaces

Figure 15:
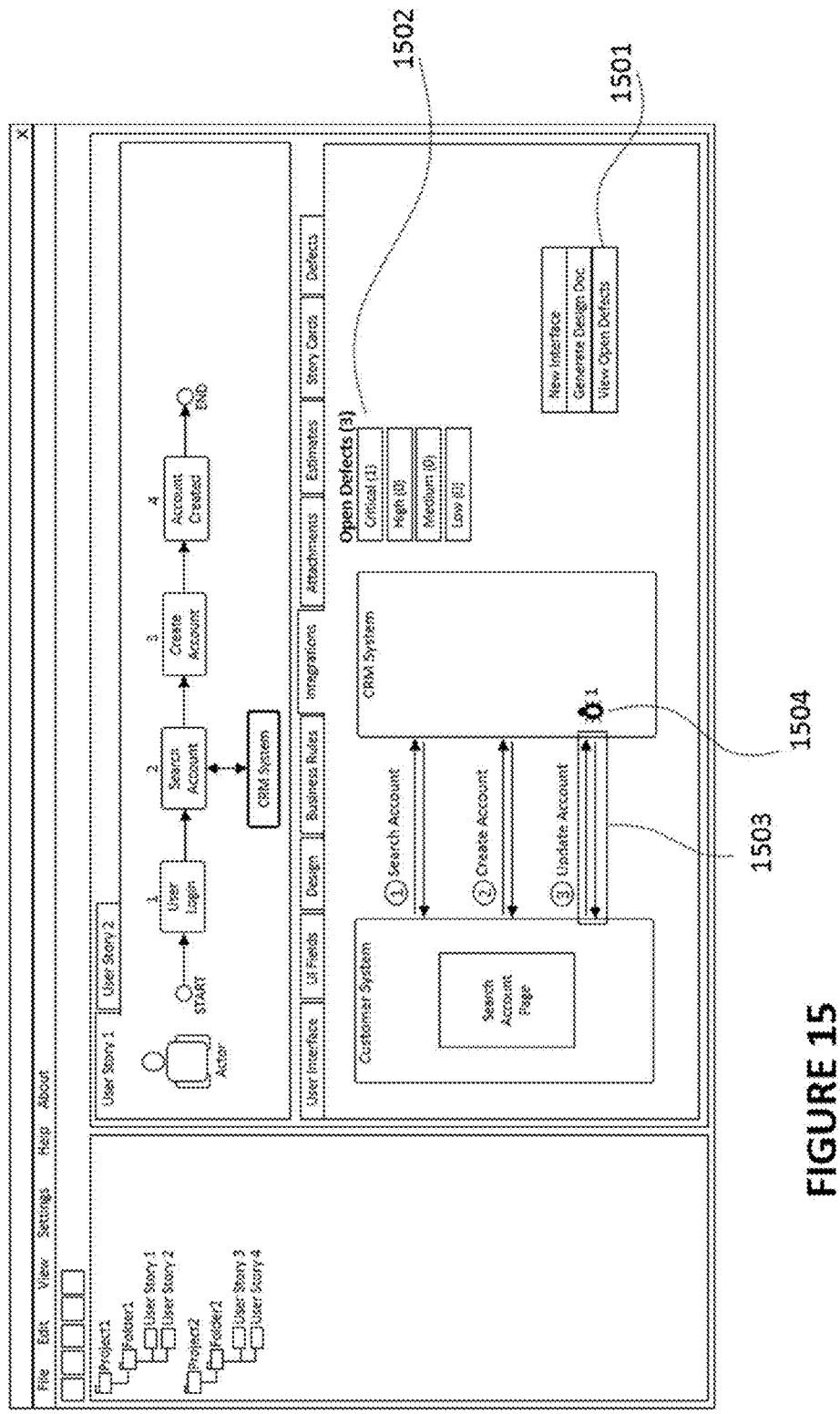
FIG. 15 is an exemplary graphical user interface showing defects at the integration interface level in accordance with the present invention.

FIG. 15 shows the ability to visually depict defects on the Integration specification with a graphical overlay and color coded visual aid. This has the advantage of showing the software defects "side by side" with the integration requirements specification. Such a "side by side" graphical view of defects alongside the integration requirements "ties together" the defects with the requirements—such an association is fundamentally important to the software development process because requirements specifications are the source of truth against which defects are written. The ability to graphically depict the defects on integration point and interfaces provides a level of detail and context that is currently lacking in the tools used today. These defects are also visually color coded for defect severity, this further aids in quick identification of the defect severity on any given integration interface. This creates an enhanced user experience that allows for quick and accurate identification of software quality of an integration point that is being developed.

The individual elements on FIG. 15 are described as follows:
1. Right click menu to view open defects 1501: Shows how the users initiate the view defect menu option by right-clicking on the screen
2. Defect Summary Legend 1502: Show a summary view of the defects statistics, broken out by defect severity
3. Highlighted Interface 1503: Shows the heighted interface where the defect exists
4. Defects Visual Depiction 1504: Allows users to see the defects visually overlaid on the integration interface specification. These defects are also color coded for severity. When users position the mouse over the interface, they can also see further details of the defects such as a short headline summary.

View Changed Integration Interfaces

Figure 16:
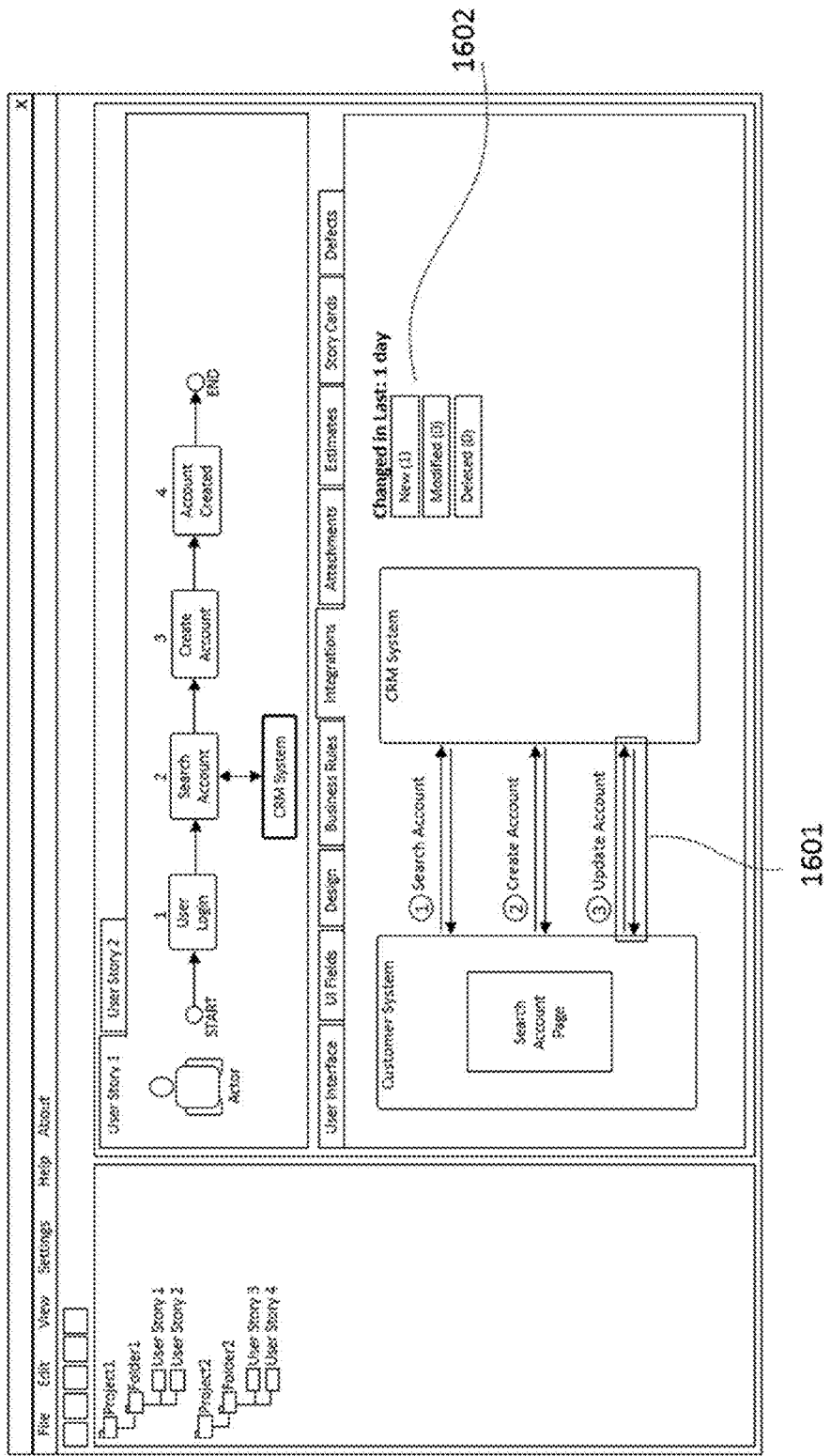
FIG. 16 is an exemplary graphical user interface showing changed integration interfaces in accordance with the present invention.

Referring to FIG. 16, the user has the ability to view changed integration interfaces in a given timeframe—with color coded visual aid for identifying changes overlaid on the UI specification. Such an ability view changed widgets in a given timeframe has the advantage of quickly identifying to the user what elements of the UI specification were modified in a given timeframe (such as an hour, a day, a week, a week, a sprint in an Agile methodology or even a custom defined time period with a start date and end date).

The individual elements on FIG. 16 are described as follows:
1. Changed interfaces summary legend 1601: Shows a summary of statistics of all the changed items in the selected timeframe
2. Changed interfaces visual depiction 1602: Allows users to see the changed integration interfaces for the integration point. These changes are highlighted with a color coded visual aid for new/modified/deleted interfaces.

The ability to visually identify incremental changes is a key enabler of incremental, iterative development process that constantly builds incremental features using an iterative approach. This allows various involved parties (such as requirements analysts, business analysts, architects, developers, testers etc.) to all have a single, consistent and accurate view of requirements with an incremental tracking capability with visual aid, resulting in a superior method of communicating changes in the application.

Automated Requirements Document Generation

The system provides the ability to automatically generate a requirement specification document (typically referred to as a business requirements document) from the UI specification. Such a document comprises user definable content including (but not limited to):
1) A cover page containing a company logo image and summary information such the project title, document title, name of the user story, the user who generated the document
2) Computer generated images of UI screens and process workflows
3) Text descriptions organized in a table view associated with the UI widgets contained in said UI screens
4) Text descriptions associated with business rules
5) Questions posted in discussions threads for each UI screen
6) Change history items associated with the UI screen
7) Associated file attachments for the UI screen The ability to generate such a requirements document from structured requirements definition in this system, is a key component of the present invention. It allows the users of the system (requirements analysts, business analysts, architects, developers, testers, product owners) with the fundamental ability to focus on the working software rather than on the exhaustive documentation of the requirements. The system lets these users to focus on the highest value added activities in the value-chain and not worry about low value added activities such as writing detailed documentation. The system takes care of the detailed documentation once the users have defined the requirements using graphical, intuitive tools in an efficient and user-friendly manner. A further benefit of this capability is more consistency and less human errors (which we can sometimes observe when users manually compose such documents).

Automated Application Design Document Generation

The system also provides the ability to automatically generate an application design document specification for each User Story, which includes user definable content including (but not limited to):
1) A cover page containing a company logo image and summary information such the project title, document title, name of the user story, the user who generated the document
2) A computer generated image of each of the UI screens in the User Story
3) Computer generated images of design diagrams showing the client-server interactions rendered from associated design pattern for each UI screen
4) Program flow steps describing program flow sequence steps on the design diagram
5) Text descriptions associated with design components contained in the design diagrams
6) Open questions in discussions posted by team members
7) Change history items
8) Associated file attachments Automated Integration Point Design Document Generation The system also provides the ability to automatically generate an integration design document specification for each Integration Point, which includes user definable content including (but not limited to):
1) A cover page containing a company logo image and summary information such the project title, document title, name of the integration point, the user who generated the document
2) A computer generated image of the UI screen that invokes the interface with text descriptions
3) Computer generated images of design diagrams showing the source system-target system interaction rendered from associated design pattern for each integration interface
4) Program flow steps describing program flow sequence steps on each interface
5) Text descriptions associated with design components contained in the design diagrams
6) Open questions in discussions posted by team members
7) Change history items
8) Associated file attachments The ability to generate such a design document from the integration patterns defined in this system, is a key component of the present invention. It allows the users of the system (requirements analysts, business analysts, architects, developers, testers, product owners) with the fundamental ability to focus on the working software rather than on the exhaustive documentation of the requirements. The system lets these users focus on the highest value added activities in the value-chain and not worry about low value added activities such as writing detailed documentation. The system takes care of the detailed documentation once the users have defined the requirements using graphical, intuitive tools in an efficient and user-friendly manner. A further benefit of this capability is more consistency and less human errors (which we can sometimes observe when users manually compose such documents). The automatically generated design documents allow software developers to focus on software development (i.e. writing programming code) rather than documentation. Time savings from automated generation also allows faster turnaround time in developing working software.

Figure 17:
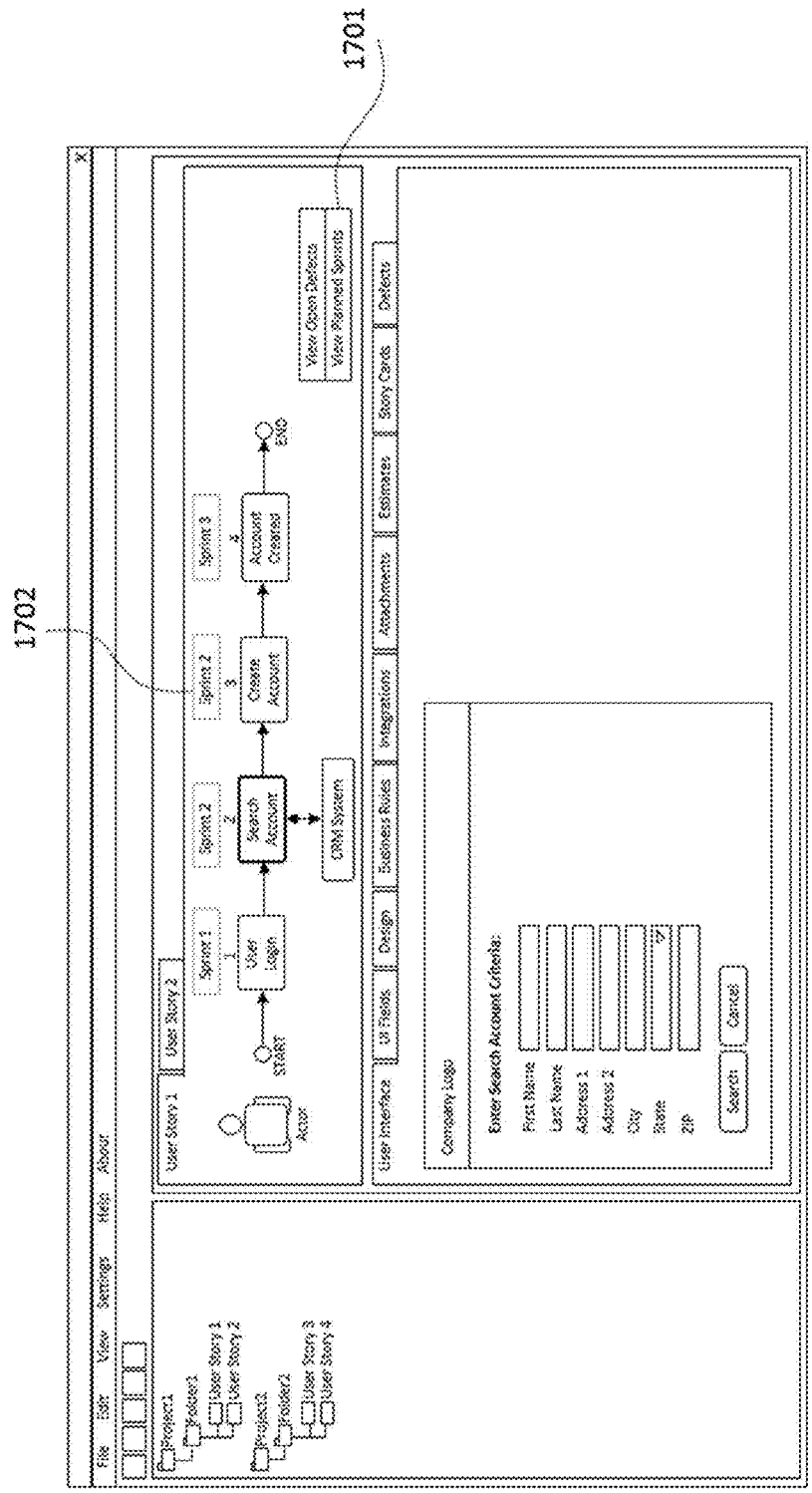
FIG. 17 is an exemplary graphical user interface showing the planned sprint for each step of a User Story in accordance with the present invention.

Visual Depiction of Planned Sprint:

FIG. 17 shows a visual depiction of the planned sprint side by side with the visual depiction of the User Story workflow. Such a visual depiction allows for a quick identification of when the various sequential steps of the User Story are planned from a timeline perspective and whether the natural sequence of the steps has been kept aligned with the planning of the work items. Such a visual depiction also allows for quick visual identification of any misalignments in planning between the user interface development and integration interface development, as there are some natural dependencies between them. This is a valuable tool for project managers.

The individual elements on FIG. 17 are described as follows:
1. View Planned Sprint 1701: When users right-click on the user story workflow panel, they can select the menu item to view the planned sprints
2. Visual Depiction of Planned Sprint 1702: Allows users to visualize see the planned sprint associated with each step of the User Story workflow, as well as the integration points.

Figure 18:
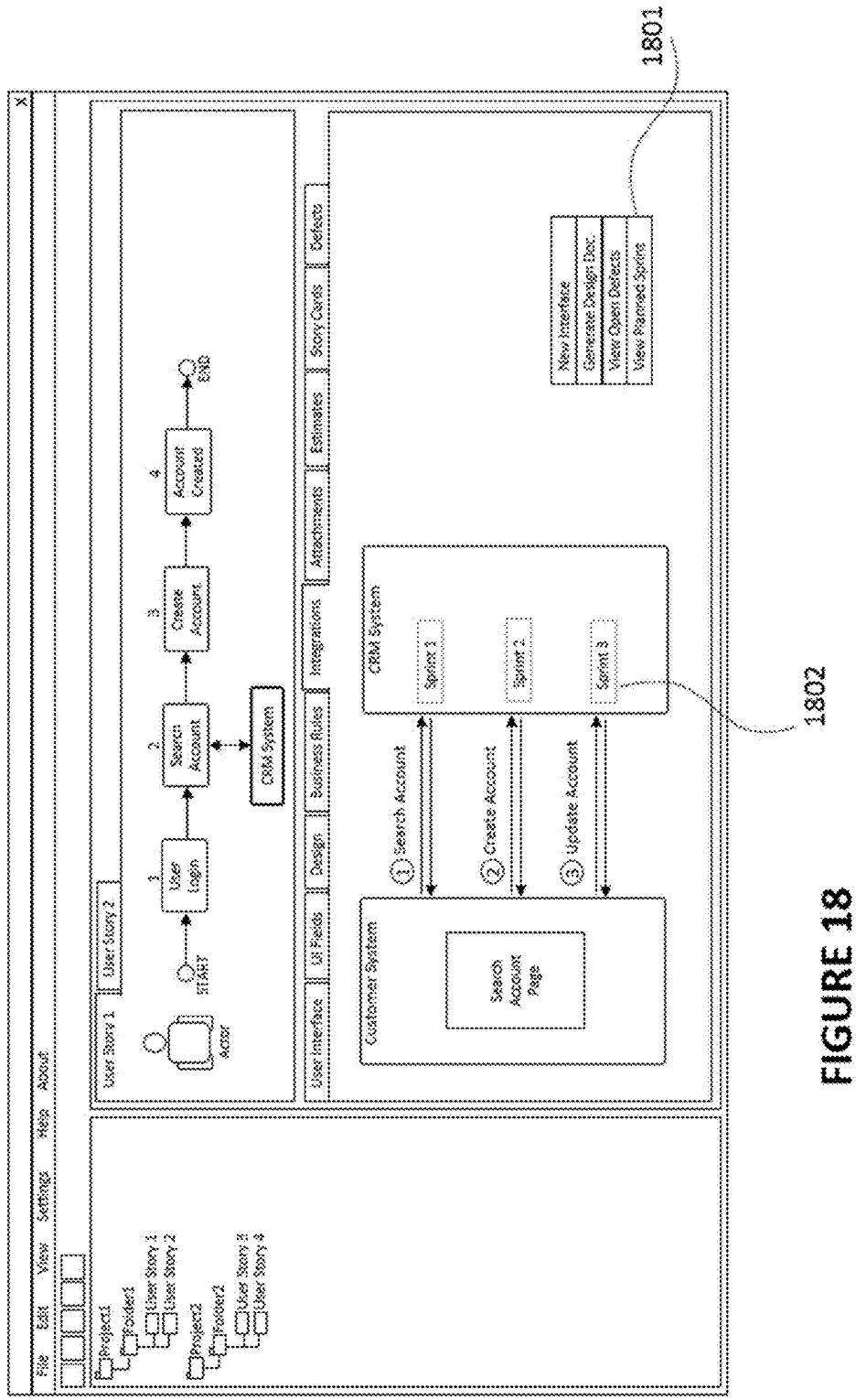
FIG. 18 is an exemplary graphical user interface showing the planned sprint for each interface of an integration point in accordance with the present invention.

FIG. 18 shows a visual depiction of the planned sprint side by side with the visual depiction of the Integration Point. Such a visual depiction allows for a quick identification of when the various interfaces of the Integration Point are planned from a timeline perspective. Such a visual depiction also allows for quick visual identification of any misalignments in planning between the user interface development and integration interface development, as there are some natural dependencies between them. This is a valuable tool for project managers.

The individual elements on FIG. 18 are described as follows:
1. View Planned Sprint 1801: When users right-click on the integration point detail panel, they can select the menu item to view the planned sprints
2. Visual Depiction of Planned Sprint 1802: Allows users to visualize see the planned sprint associated with interface of the integration point Automated Effort Estimation The present invention provides a systematic method for automatically estimating tasks, driven from the requirements and design specifications. Such an automated method of estimation allows for more consistency, accuracy as well as time savings for the people involved in such activities.

The system can automatically generate effort estimates associated with the development of UI screens and Integration Interfaces, with a user-definable estimation method selected from one of several methods including:
1) Calculating effort estimate defined by complexity factors
2) Using an Estimate Template—Calculating effort estimate defined by type of UI widget being developed and type of change (new, modified or deleted)
3) Calculating effort estimate defined by underlying design components in the design pattern wherein the estimate accounts for fixed and variable cost of development; the variable cost varies by the number of UI widgets or data fields in the integration interface 4) A fixed effort estimate for a task (for example setting up a server takes 3 hours)

5) Calculating effort estimate as a percentage of a related effort (for example test effort could be 20% of coding effort)

An Estimate Template is one of the key constructs that allow for estimates to be automatically generated.

The present invention provides the ability to define an estimate template at a project level that allows you to specify work effort estimate for user interface related tasks and integration related tasks. Such an estimate template comprises: the associated task effort for new, modified and deleted UI widgets. These define the effort estimate at a very fine grained level, i.e. down to the type of widget involved and the corresponding attributes of the widget and changes made to such widgets. The user can customize the effort estimate by widget types—as some widgets are more complex to develop and test than others.

The effort estimate for integration interfaces is driven by effort estimates defined for integration patterns at the design component level, which in turn comprises two components—fixed and variable parts of the effort estimates. The variable part of estimate varies by the number of data fields defined in the integration interface. An interface with a large number of data fields will take more effort to develop and test compared to an interface with a smaller number of data fields. The variable part of the effort is thus driven by the number of data fields. The fixed part of the effort estimate does not vary by the number of data fields. The total effort for a design component is the sum total of the fixed and variable parts. The estimates at the design component level let the user specify the factors for the fixed and variable parts of the effort. This allows flexibility in controlling the fixed and variable nature of the work effort involved. For example, by setting the variable factor to zero, you can make the effort totally fixed. By setting the fixed part to zero, you can make it completely variable. By setting both of these to non-zero values, you can achieve a combination of fixed and variable that better reflects the effort of the work item involved.

The task effort varies by Skill Level of a resource who will be working on it. Time taken to complete a task is a function of the skill level of the resource. The skill level factors can also be defined by the user and allow the user to customize such a variation by skill level. The skill level factors are multiplied with the raw calculated estimates to come up with skill-level adjusted effort estimates. The user (typically a project manager) can also choose to turn this feature off by setting all the factors to 1.

The learning curve effect factor allows the effort estimate to be adjusted after each iteration of the development process, as the team is expected to perform more efficiently since the team members are constantly learning and improving. The learning curve effect factor is used to adjust the effort estimates based on this factor. With each passing iteration, the raw estimates are multiplied with this factor to come up with adjusted effort estimates. The user (typically a project manager) can also turn off this adjustment by setting the factor to 1.

The percentage of effort for testing and design can also be set as a percent of development effort for Integration Interfaces. You can specify the testing and design estimates as a percentage of the development effort. Such an approach generally makes sense in situations where development complexity and effort drives the complexity of the testing and design effort as well and they are generally well correlated.

Furthermore, the present invention provides an adaptive estimation capability—at the end of each development iteration, the system allows you to optionally adjust the estimate factors by comparing the actual effort with estimates at the beginning of the iteration (the system also tracks actual effort on the assigned work items). Such an adaptive method of adjusting the estimate factors over time results in improved accuracy with each iteration as the estimate factors are constantly adjusted based on actual results. When this feature is used, the learning curve factor should be disabled (set to 1) as the learning curve effect is already accounted for in this approach.

Automated Story Cards and Tasks Generation

The system can automatically generate Story Cards from the Requirements Specifications. Story Cards within the context of the present invention represent work items that are assigned to people to work on, with a description and effort estimate. Story Cards also track the actual effort spent on the task, on a daily basis. Story Cards are created for each of the four core tasks associated with software development—requirements analysis, software design, software development (coding) and software testing. Story Cards are created automatically using Story Card templates without any manual input from the Project Manager. This is one of the key benefits of the system, allowing automation of what remains today mostly a manual work item. Story Card templates specify what story cards need to be created automatically for each UI page or integration interface. They allow you to control the process of automatic story cards creation. For each Story Card, the system also creates a list of associated detailed tasks—such as creating, modifying or deleting widgets (for user interface related story cards). For integration interface related Story Cards, the system creates tasks associated with the various design components for the integration pattern. User assignments can be specified by the project manager. Story Cards are created automatically and the automated estimates from the previous section are applied to the story cards.

Figure 19:
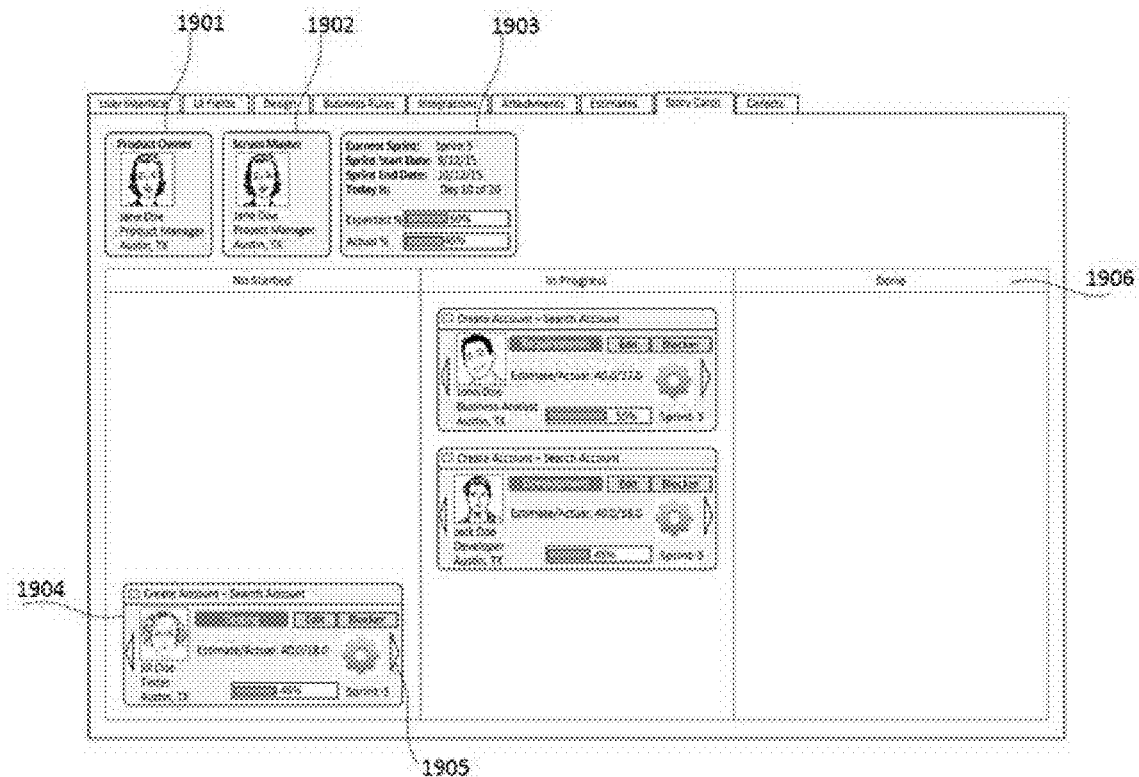
FIG. 19A is an exemplary graphical user interface showing the visually organized story cards of a user story step or interface in accordance with the present invention.
FIG. 19B is an exemplary graphical user interface showing the visual details of each story card of a user story step or interface in accordance with the present invention.
Figure 19:
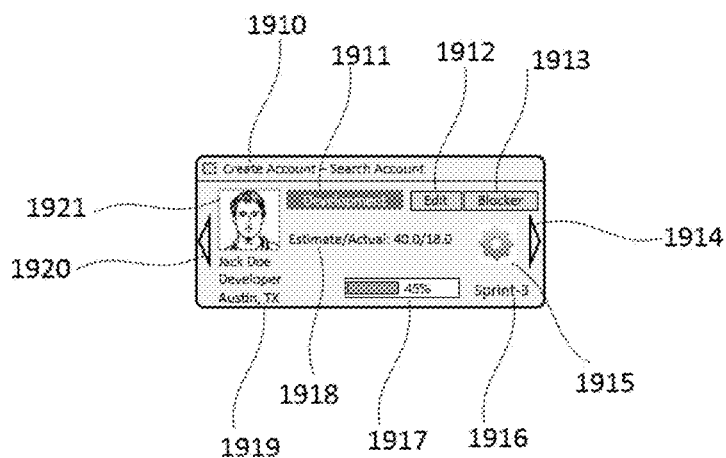

The system can automatically generate the tasks necessary to complete the development by defining and applying task creation templates. Each Story Card creation template defines attributes such as:

1. Task type
2. Name and description
3. Estimation method (chosen from one of the methods described above)
4. Email notification method upon task completion
5. Whether a review is required to complete the task Project Managers have the capability to edit the estimates ("override" the calculated estimates). Once the Story Cards are generated, each Story Card visually depicts the following information:

1. Story Card Name—Derived from the User Story name and User Story Step name
2. Type of task—requirements analysis, software design, software development (coding) and software testing
3. Estimate (hours)—Calculated estimate (automatically calculated by the system)
4. Actual Hours spent by the person working on it
5. User who is assigned to working on it—this shows a profile picture (image), as well as name, role, and address 6. Navigation Controls—left and right navigation controls to move the story cards into one of the customizable status lanes
7. Progress indicator—a progress bar widget that visually depicts the percentage completed for the task FIG. 19A shows the details of the Story Cards tab for each UI page or integration interface as follows:
1. Product Owner 1901: Shows visually who the product owner is for this UI page or integration interface
2. Scrum Master 1902: Shows visually who the project manager is for this project
3. Current Sprint information 1903: Shows visually information related to the in-progress sprint (iteration)
4. Individual Story Card 1904: Shows an individual story organized in a visual manner in status lanes
5. Story Card Status Lanes 1905: Shows visually the status lanes which are customizable by the user FIG. 19B shows the details of an individual Story Card:
1. Story Card Title 1910: Story Card title derives from the User Story name and User story Step name. For integration interfaces, Story Cards derive from the interface name
2. Task Type 1911: Type of the task such as requirements, development, testing.
3. Edit Button 1912: Allows users to edit the story card properties
4. Blocker Button 1913: Allows users to add blocker related information
5. Status icon 1915: Show a visual status icon
6. Assigned sprint 1916: Shows the planned Sprint (iteration)
7. Estimates and Actual Hours 1918: Estimates are the calculated estimates and are the hours entered by the people working on the tasks
8. Right Navigation Control 1914: Right navigation control allows users to move the Story Card to the lane right of the current lane
9. Navigation Control Left 1920: Left navigation control allows users to move the Story Card to the lane left of the current lane
10. Assigned User 1921: Shows the user who is assigned to working on this Story Card
11. Progress Bar 1917: Show the percentage completed (%) for the story card. The percent completed is calculated by the system based on what tasks are completed by the user
12. User Information 1919: Shows the User full name, role and location When users position the mouse over the story card, a pop up display shows more details about the metadata associated with the Story Card. Such metadata includes a description of the user story step, type of story card, status, time spent in current status, details of the individual tasks associated with the story card (such as creating, modifying or deleting UI widgets) and associated estimate for each task. Users assigned to working on a story card can enter their actual hours to date spent working on the story card, as well as select from a drop down list, the build environment to which the software has been deployed. Users can also specify percent complete for the story card, either by typing in a custom value, or have the system calculate the percent complete by indicating which of the tasks have been completed. When software is deployed to particular build environment, the relevant users who care about such events are notified by automated system email notifications. The system provides the ability to create a "blocker" on the story card. Such a blocker indicates that the assigned user is not able to proceed with the normal course of working on the work item because of a certain impediment (known as a blocker). For example, a business decision needs to be made for the requirements analysis to proceed further. The present also allows the users to specify custom blocker reasons in the system, in addition to the ones already created by the system. Blockers are defined at two levels—at risk and blocked. At risk indicates that the story card is at risk of being blocked but not yet blocked, while "blocked" indicates that a story card is already blocked.

The system also provides the ability for reviewers, typically "product owners", to be able to create a review for a story card for which they are responsible to review. Once a review is created on a Story Card, it can be either approved, not approved or approved conditionally. The user working on the story card is automatically notified of such an update through an email notification system. The review history is also preserved on the story card itself (on the "reviews" tab on the story card wizard).

Blocking and Un-blocking Story Cards

Blocked Story Cards are rendered with a visual status icon that represents whether the story card is blocked or at risk of being blocked. The visual depiction also shows for how many days has this story card been blocked or at risk. This is very important information for Project Managers to act upon as they are primarily responsible for removing these blockers. When user positions the mouse cursor over the blocked icon, a pop up text display shows further details about the blocker—date when blocked, who created the blocker (typically this would be the assigned user), blocker reason and blocker comments. Such detailed information tracking and storing in the system is extremely useful and valuable information for project managers. The system also automatically generates email notifications to assigned project managers when blockers are created. Project Managers also get a daily email notification from the system with a complete listing of all the blockers in the system assigned to the project they are working on. Such email notifications provide additional tools for the project managers to get organized and focus and be more productive. Blocked story cards can be easily unblocked by the users using the blocker wizard.

Automated Test Case Generation

The present invention allows for test cases to be automatically generated from the requirements specifications. Test cases are a detailed and step-by-step set of instructions for testing the application against the requirements specification. Test cases are typically manually constructed today—having a systematic and automated method of generating test cases from the requirements is a valuable tool for efficiency as well as consistency and accuracy. The present invention generates three types of test cases associated with a user story:
1. Happy Path Test Case: Provides a detailed set of instructions for the happy path scenario of the user story. This can also be used for "smoke test" or "quick test".
2. Incremental Change Test Cases: Provides a test case associated with incremental changes made to the requirements specification including business rules associated with user interface and widgets. Such incremental changes can be constrained to be defined for a particular date range.
3. Detailed, regression test cases: Provides a complete set of test cases associated with all the widgets and business rules defined in the system, regardless of when the changes were made Defect Management—Forecasting Completion Using Predictive Modeling The present invention provides a method of forecasting defect completion through predictive modeling. Project managers and stakeholders are interested in an extrapolation of the defect completion trend to understand when the project will be done. The definition of "done" would include achieving a certain target defect metric level.

Users can define Target Defect Metrics by defect severity—for example:
Critical Severity Defects=0
High Severity Defects=0
Medium Severity Defects <5
Low Severity Defects <10

Such an ability to predict the defect completion date is valuable in the "system testing" phase of the software application development. In the system testing phase of the development lifecycle, no new features are being developed and the focus is on finding all the defects and fixing them. Once the system testing is underway, and a reasonable trend has been established for finding and fixing defects, the present invention allows for a predictive model to be built that can forecast the completion dates based on a defined "target level" of defect metrics.

On a daily or week-by-week basis, system models the 3 key inputs (rate of discovery, rate of resolution, and rate of re-open) as a function of time. The predicted completion date is then calculated using the predictive modeling method. The user can modify the weightings for defect severity. A user will be able to perform "what if" scenarios by adjusting assumptions about the input data values, and also by adjusting how those variables are involved in the calculation. For example, rates of discovery and rates of resolution may or may not be treated as linear, favorable or non-favorable.

A predictive model for future days and weeks is built by calculating the ending inventory:

Ending Daily/Weekly Open Defects Inventory=Starting Inventory+Defects Discovered+Defects Re-opened−Defects Resolved The time to resolve uses "weights" to multiply based on severity of defect. This is needed as development effort and test effort is a function of the severity—and time spent is interchangeable (i.e. a developer can spend X amount of time to fix 1 critical severity defect or 4 low severity defects). Furthermore, discovery of defects may not arrive linearly—they may increase or decrease non-linearly. Time to resolve defects may depend non-linearly on severity and/or on rate of defect discovery. One can assume the % mix by severity remains constant for defects discovered (one can be optimistic and assume that mix improves over time), or one can modify that parameter as well.

The user has the ability to modify and adjust all these assumptions in a "what if" scenario analysis. Such assumptions as:
The Rate of discovery of new defects will stay at the current trend or get worse or get better
The Rate of resolution of new defects will stay at the current trend or get worse or get better
The Rate of re-opening of verified defects will stay at the current trend or get worse or get better
The severity mix (percentage breakdown by defect severity) of new defects will stay at the current trend or get worse or get better The present invention first calculates the "health indicators" of 6 key model inputs:

Rate of Open is in downtrend or flat
Rate Resolution is in uptrend or flat
Resolved/Open Ratio is higher than 1
Re-open rate is flat or in down trend
Total open defects (weighted by severity mix) is in downtrend
Severity mix is constant or favorable (the percentage of critical or high severity is dropping)

The above key model indicators allow the user to determine the quality of the predictive model as a starting point. Each of the above indicators is modeled as—Good, Neutral, Bad. These are then displayed with color coded visual aid. Once a reasonably good predictive model quality is achieved, the predictive model is in a zone where it can predict with reasonable accuracy. It is then able to calculate the likely completion dates. Being able to predict completion dates with a reasonable confidence level is thus a two-step process, first the system ascertains the quality of the predictive model inputs, and then calculates the predicted completion dates.

From the predictive model, the system calculates three possible end dates for the system testing phase—Most Likely Completion Date, Optimistic Completion Date and Pessimistic Completion Date. This allows project managers to be able to forecast the completion date with a range of dates with associated confidence levels. Such information on predicted completion dates can be very valuable to project managers and other stakeholders.

Advanced Text Search Capability

Figure 1:
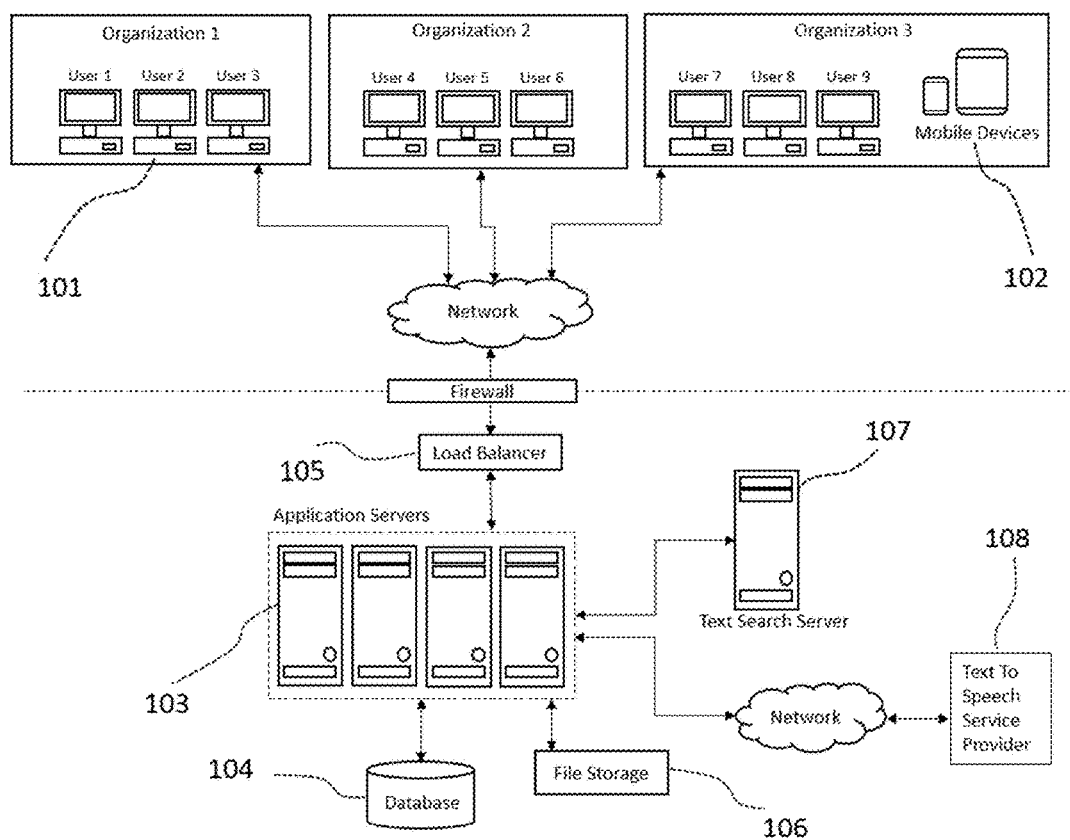
FIG. 1 shows the hardware components of a computing system that enables a typical deployment of the present invention.
Figure 2:
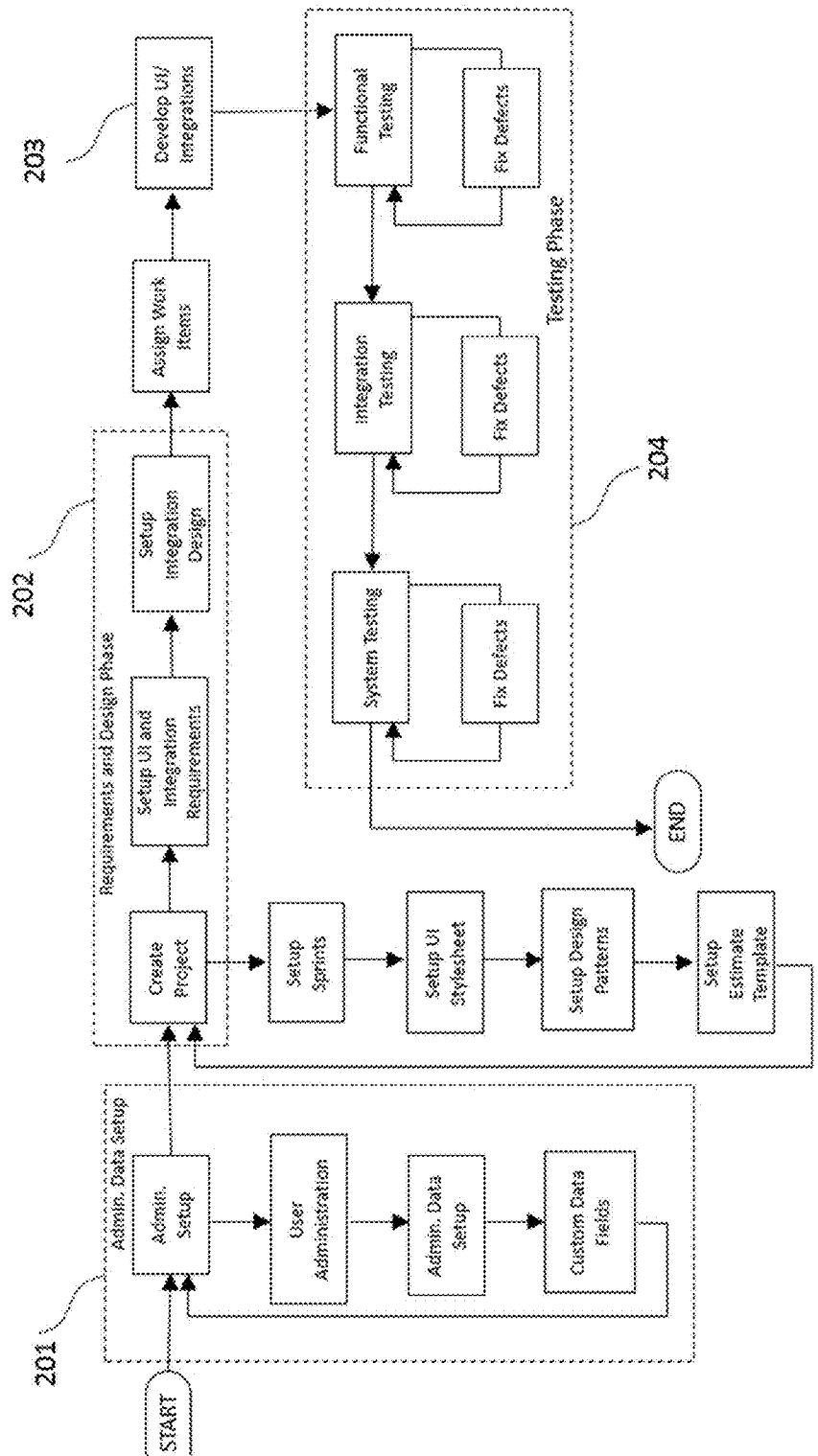
FIG. 2 is a flow chart of the process flow of managing a software development project using the present invention.

The present invention also provides an integrated text search capability that allows users to search across a wide variety of artifacts and data constructs such as User Story name and description, User Story step name and description, User interface widgets and any related text (such as label, drop down values, business rules), Business Rules and any related attributes, Integration Points specification and any related attributes (including name, description and business need), Integration interface specifications (including name, description and business need, Discussion threads (including replies as well as original posts), Defects and all related attributes. This integrated text search capability allows the system to overcome a number of limitations associated with current set of tools—such as the ability to search across multiple documents in a user friendly manner, ability to search in user interface widgets, ability to search using meta-data, ability to search in business rules, ability to search using "fuzzy logic" and more. FIG. 1 (reference numeral 107) also depicts a dedicated Text Search server that indexes the text content of all the content generated in the system by the users. Once the text indexing is completed, the Text Search server also allows for searching of text through an Application Programming Interface that the Client applications can then access through the Server resources.

The text search results are organized by the project, user story, user story step, matching element, matching attribute and matching text. The resulting tabular display in this format significantly helps users in quickly identifying where the search results are located.

Mobile Device Access

As depicted in FIG. 1 (reference numeral 102), the present invention also accommodates mobile devices such as smart phones, mobile phones, tablets to access the software functionality through a Mobile Application client. Such a Mobile Application client allows these mobile devices to receive updates, alerts, notifications and other useful information regarding the projects that they are a part of. These mobile applications also allow the mobile device users to do a set of user actions such as approve a work item, post a new discussion thread or reply to a discussion thread, resolve a defect or update a defect, view file attachments, block or un-block a story card among others.

Automated Email Notifications

The present invention also creates automated notification emails that are sent to the relevant users. Email Notifications contain all the necessary related information which includes text as well as images. Emails are sent using real time and batch notification modes. Real time notifications are sent when (but not limited to):
1. Story Cards are blocked or un-blocked (sent to the entire team for the story card)
2. New defect is created (sent to the entire team for the story card)
3. Defect is resolved and deployed (sent to the entire team for the story card)
4. Story Card is completed and in final status (sent to the product owner)
5. Story Card is reviewed (sent to the assigned user)
6. New Discussion Threads are posted
7. Replies are posted to the Discussion Threads
8. Story Card is completed and ready to test (deployed)

Similarly, the system also creates batch mode email notifications to the users with a daily batch frequency (weekend excluded). Such daily email notifications are used to indicate the following (not limited to):
1. List of outstanding discussion threads for which you are responsible to respond
2. List of all open defects assigned to you
3. List of all blocked and at-risk story cards (sent to Project Manager)
4. Project level defect dashboard summary (sent to Project Manager)
5. List of all Story Cards for which you are the reviewer and for which a review is due
6. Defect Predictive Model forecasting (Sent to Project Managers)

Users are able to customize preferences associated with the above email notifications—to select what kinds of notifications they would like to receive or not receive.

Collaboration Tools

The present invention also provides for collaboration tools that are necessary for a team oriented software development project. The system allows users to post questions or comments (referred to as discussion threads) related a requirement for a user interface, business rules or integration interfaces, as well as defects. Such a discussion thread capability allows users to collaborate together on this system rather than relying on email communication. The advantage of using the system over email is that the system provides a much better context for the questions or comments being discussed. The users see the discussions "side by side" with the requirements specification. Such a "side by side" view provides for a much improved communication channel with an excellent context for users. Users can also reply to the posts, thus allowing multiple people to chime-in and allow the best possible solution to a problem be discussed or agreed upon in a collaborative manner. When users post a question, they also select a topic associated with it. This allows the system to automatically assign the correct user on the team as the responsible party for the question. This also allows the system to send email notifications and track the life cycle of such questions that need user response. The system then generates automated daily email notifications for all the questions that a particular user is assigned to.

Once the original user who posted the question "resolves" the question, it is no longer considered open. Users can also filter the list of discussion by the status of the discussion threads (all, only resolved, only un-resolved).

Discussion Threads can be created on User Interface requirements (associated with a user story step) or with an integration interface as well. Discussions can also be created for Defects, allowing users to discuss the various aspects of the defects.

Data Model Requirements Specification

The system can also manage the Data Model Requirements specification, comprising Data Model Objects (also known as entities or tables) and Data Model Fields (contained within objects, also known as data model columns). The system enables users to capture all the data model objects and contained data model fields, specifying key attributes such as data type (such as text, number, picklist, boolean etc.), whether it is custom, whether it is required or optional, textual description, field size (for example size of a text field in number of characters). Data Model requirements specification is an important aspect of software application development, and the system allows software development teams to manage them using a visual, centralized and collaborative system, instead of using disparate spreadsheets.

FIG. 20 shows the details of the Data Model Requirements specification feature as follows:
6. Toolbar 2001: Toolbar with buttons to manage the data model requirements, add and edit objects and fields, delete items, export data dictionary, export/import from text file, view custom objects and fields only
7. Data Model Object 2002: Shows an example of a Data Model Object (entity) with its associated attributes (such as custom, required, description)
8. Data Model Field 2003: Shows an example of a Data Model Field (such as custom, required, description)

Automated Data Dictionary Document Generation

The system provides the ability to automatically generate a Data Dictionary (data model requirement specification document) from the Data Model Requirements specification. Such a document comprises:
8) A cover page containing a company logo image and summary information such the project title, document title, name of the user story, the user who generated the document
9) Computer generated text descriptions organized in a table view, for the data model objects and fields
10) Color coded highlights for custom objects and fields The ability to generate such a Data Dictionary document from structured requirements definition in this system, is a key component of the present invention. It allows the users of the system (requirements analysts, business analysts, architects, developers, testers, product owners) with the fundamental ability to focus on the working software rather than on the exhaustive documentation of the requirements. The system lets these users to focus on the highest value added activities in the value-chain and not worry about low value added activities such as writing detailed documentation. The system takes care of the detailed documentation once the users have defined the requirements using graphical, intuitive tools in an efficient and user-friendly manner. A further benefit of this capability is more consistency and less human errors (which we can sometimes observe when users manually compose such documents).

Automated User Guide Generation

The system provides the ability to automatically generate a detailed User Guide for the software application. The User Guide is an end-user oriented document that explains how the application functions from an end-user's perspective, with the goal of minimizing the learning curve associated with using the application. Such a document comprises:

1) A cover page containing a company logo image and summary information such the project title, document title, name of the user story, the user who generated the document
2) Computer generated text descriptions for each application feature
3) Computer generated images for UI screens associated with the application feature, with visual callouts for user interaction with the system
4) Computer generated user steps associated with each of the visual callouts (as described in step above)

The ability to generate such a User Guide document from structured requirements definition in this system, is a key component of the present invention. It allows the users of the system (requirements analysts, business analysts, architects, developers, testers, product owners) with the fundamental ability to focus on the working software rather than on the exhaustive documentation of the user guide. The system lets these users to focus on the highest value added activities in the value-chain and not worry about low value added activities such as writing user guide documentation. The system takes care of the detailed documentation once the users have defined the requirements using graphical, intuitive tools in an efficient and user-friendly manner. A further benefit of this capability is more consistency and less human errors (which we can sometimes observe when users manually compose such documents).

Figure 21:
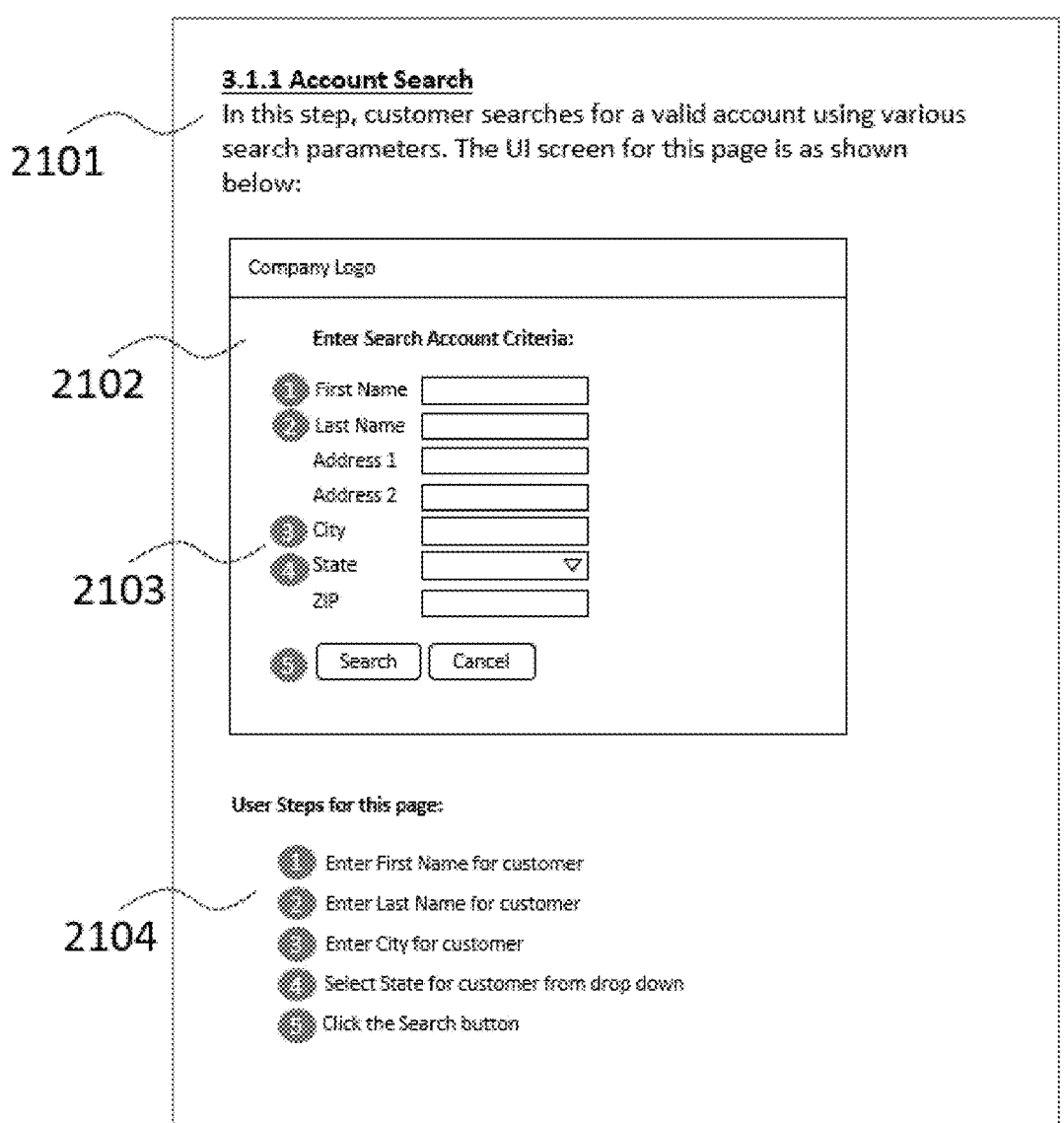
FIG. 21 is an exemplary section of a user guide document that has been automatically generated, showing the feature description, UI screen, visual callouts for steps that describe user interaction with the application.
Figure 22:
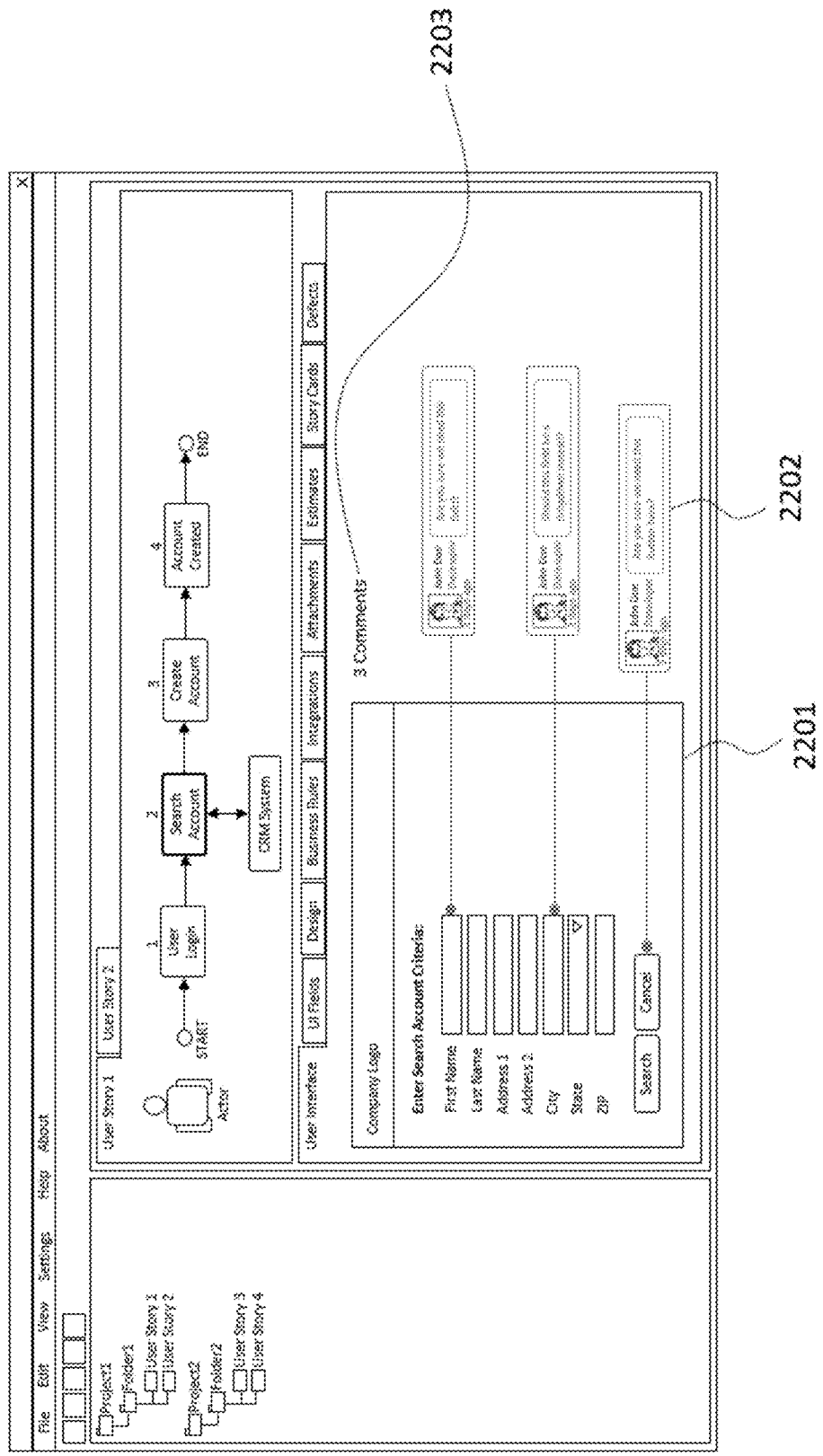
FIG. 22 is an exemplary graphical user interface showing how user comments are captured and displayed as overlaid visual comments on the UI screen specification in accordance with the present invention.

FIG. 21 shows the details of the User Guide generation feature as follows:

1. Feature Description 2101: Text description of the application feature, which is extracted from user defined requirements specification
2. UI Screen 2102: Shows an example of a UI Screen generated from user defined requirements specification
3. User Interaction Visual Callout 2103: Shows an example of a visual callout for a user interaction with the software application
4. Text Description for Visual Callout 2104: Shows an example of the textual descriptions of the user interactions with the software application Visual Depiction of User Comments:

The System allows the team members to capture their comments on the UI requirements specification. Users can enter their comments for each UI screen, and also optionally attach them to a specific UI widget on the UI screen. This feature enables better team collaboration as it overlays the User Comments visually on top of the UI screen specification. FIG. 22 shows a visual depiction of the User Comments overlaid on the UI screen specification. Such a visual depiction allows for a quick identification of the User Comments associated with individual UI widgets on the UI screen. This is a valuable tool for the entire team as it enhances team communication and collaboration.

The individual elements on FIG. 22 are described as follows:

3. UI Screen Specification 2201: This is the UI screen specification associated with a particular step of the process workflow for a feature
4. User Comment 2202: Shows an example of the User Comment associated with a UI widget on the UI screen. User Comments need not be associated with a UI widget, in which case they are meaningful in the context of the overall UI screen, not a specific UI widget.
5. Number of Comments 2203: Shows an example of a display of number of User Comments present on a UI screen.

What is claimed is:

1. A method to develop a software application, the method executed by software instructions stored in a memory and executed by a hardware processor, comprising the steps of:
   a. managing communications among several groups who are working on a common software application by providing an interactive subsystem among the team members;
   b. defining a process workflow for a plurality of software application features;
   c. defining a plurality of user interface (UI) details including UI widgets associated with each step of the process workflow;
   d. defining a plurality of requirements specific details associated with a plurality of UI widgets;
   e. defining a plurality of business rules, associated with each step of the process workflow;
   f. defining a plurality of re-usable technical design patterns for the software application, each design pattern comprising attributes including:
      i. name and description;
      ii. a plurality of visually organized design components;
      iii. a plurality of visually organized program flow steps, each flow step comprising a step number and step description;
      iv. a plurality of visually organized arrow shapes depicting program logic invocation;
      v. a plurality of file attachments allowing users to add additional data for each pattern; and
   g. producing the finished software application by programming and testing the software application according to said requirements and design specifications.

2. The method of claim 1, further comprising the step of:
   a. automatically generating from the user defined requirements specifications, an audio-video playback sequence explaining the process workflow with computer generated speech from user defined text for a plurality of UI widgets, and using visual pop-up text elements describing the user interaction with said software application for a plurality of application features, aiding in immediate and effective grasping of the application feature.

3. The method of claim 1, further comprising the steps of:
   a. automatically generating a requirements specification document for a software application feature, containing user-definable content including:
      i. a cover page containing a company logo image and summary information;
      ii. a plurality of computer generated images of UI screens and process workflows;
      iii. a plurality of text descriptions organized in a table view associated with the UI widgets contained in said UI screens;
      iv. a plurality of text descriptions associated with business rules;
      v. a plurality of questions in discussions;
      vi. a plurality of change history items;
      vii. a plurality of associated file attachments;
   b. automatically generating a design document for each software application feature, having detailed technical instructions for a programmer to implement the application feature, and containing user-definable content including:
  i. a cover page containing a company logo image and summary information;
  ii. a plurality of computer generated images of UI screens and process workflow;
  iii. a plurality of computer generated images of design diagrams rendered from the associated design pattern for each UI screen;
  iv. a plurality of text descriptions organized in a table view associated with the UI widgets contained in said UI screens and containing design information;
  v. a plurality of text descriptions associated with design components contained in the said design diagrams;
  vi. a plurality of open questions in discussions posted by team members;
  vii. a plurality of change history items;
  viii. a plurality of associated file attachments;
c. automatically generating a design document for each integration point, having detailed technical instructions for a programmer to implement a plurality of integration interfaces, and containing user-definable content including:
  i. a cover page containing a company logo image and summary information;
  ii. a computer generated image of the UI screen with text descriptions;
  iii. a plurality of computer generated images of design diagrams rendered from associated design pattern for each integration interface;
  iv. a plurality of program flow steps describing program flow sequence;
  v. a plurality of text descriptions associated with design components contained in said design diagrams;
  vi. a plurality of open questions in discussions posted by team members;
  vii. a plurality of change history items; and
  viii. a plurality of associated file attachments.

4. The method of claim 1, further comprising the steps of:
a. visually depicting a plurality of changed items associated with each user interface screen, business rule and integration interfaces, wherein the changes are visually rendered with a color coding scheme that identifies the type of change—a new item, changed item or deleted item, allowing the user to immediately and effectively grasp the incremental changes made in a user-definable time period; and
b. tracking and visually depicting a plurality of UI widgets deleted by the user, in a separate area of the visual rendering of the UI, to aid in effective understanding of deleted UI widgets from the UI requirements specification.

5. The method of claim 1, further comprising the step of:
a. automatically generating an effort estimate associated with the development of said UI screens and Integration Interfaces, with a user-definable estimation method selected from one of several methods including:
  i. calculating effort estimate defined by complexity factors;
  ii. calculating effort estimate defined by type of UI widget being developed and type of change (new, modified or deleted);
  iii. calculating effort estimate defined by underlying design components in the design pattern wherein the estimate accounts for fixed and variable cost of development wherein the variable cost varies by the number of UI widgets or data fields in the integration interface;
  iv. a fixed effort estimate for a task; and
  v. calculating effort estimate as a percentage of a related effort.

6. The method of claim 1, further comprising the steps of:
a. automatically generating tasks necessary to complete the development by defining and applying task creation templates specifying attributes including:
  i. task type selected from a pre-defined list;
  ii. name and description;
  iii. estimation method;
  iv. email notification method upon task completion;
  v. whether a review is required to complete the task; and
b. organizing the automatically generated tasks in status lanes with summary information about said tasks and the ability to update the status of said tasks with navigation controls to move the task to the next or previous status lanes.

7. The method of claim 1, further comprising the steps of:
a. automatically generating a plurality of test cases associated with a plurality of requirements specifications for UI widgets and business rules for each UI screen of a plurality of software application features; and
b. limiting the test cases generated based on a user-definable time period or development iteration for constraining the test cases to the changes made to the requirements in the specified time period.

8. The method of claim 1, further comprising the steps of:
a. visually depicting defects associated with a UI screen overlaid visually on individual UI widgets with color coded aid for defect severity to aid in immediate and effective identification of open defects;
b. visually depicting defects associated with a process workflow of a software application feature, overlaid visually on individual UI steps with color coded aid for defect severity to aid in immediate and effective identification of open defects across the software feature;
c. visually depicting the planned development iteration number on individual UI steps of a process workflow to aid in immediate and effective identification of project management related information for developing the software feature; and
d. visually depicting the planned development iteration number on a plurality of integration interfaces of an integration point to aid in immediate and effective identification of project management related information for developing the software feature.

9. The method of claim 1, further comprising the step of:
a. calculating the predicted date for closing of defects across the software application by:
  i. measuring and tracking defect opening rate over time;
  ii. measuring and tracking defect resolution rate over time;
  iii. measuring and tracking defect re-opening rate over time;
  iv. measuring and tracking the severity mix of the defects over time;
  v. projecting out defect open rates and resolution rates for future;
  vi. applying the projected open, close and re-open rates to the future and calculating a daily projected inventory of defects; and vii. calculating the predicted date for defect closure for best case, worst case and expected case scenarios.

10. The method of claim 1, further comprising the steps of:
   a. searching for user-defined text terms across the entire user defined content in the system, wherein a plurality of results of the text search are displayed in a structure comprising:
      i. project where the search result is found;
      ii. application feature where the search result is found;
      iii. UI screen where the search result is found;
      iv. matching element on the UI screen where the search result is found;
      v. matching text attribute of the matching element where the search result is found;
      vi. matching text within the matching attribute with the search terms highlighted; and
   b. allowing users to specify from a plurality of content areas to include in the search results.

11. The method of claim 1, further comprising the step of:
   a. automatically generating a user guide for the software application, having detailed instructions for an end-user to use a plurality of application features, and containing generated content including:
      i. a cover page containing a company logo image and summary information;
      ii. a plurality of computer generated text descriptions for each application feature;
      iii. a plurality of computer generated images for UI screens including numbered visual callouts for user interaction with the system; and
      iv. a computer generated user step associated with each of the visual callouts.

12. The method of claim 1, further comprising the steps of:
   a. defining a plurality of data model requirements associated with the software application including data model objects and data model fields, with associated attributes;
   b. automatically generating a data dictionary document for the software application, having detailed data model descriptions containing generated content including:
      i. a cover page containing a company logo image and summary information;
      ii. a plurality of computer generated text descriptions organized in a table view, for the data model objects and fields; and
      iii. a plurality of computer generated color coded highlights for custom objects and fields to aid in immediate and effective grasping of custom data model objects and fields.

13. The method of claim 1, further comprising the step of:
   a. capturing a plurality of user comments and visually depicting said user comments associated with a UI screen, each user comment optionally associated with a UI widget to aid in immediate and effective identification of user comments.

14. The method of claim 1, further comprising the step of:
   a. defining a plurality of re-usable integration points between the software application and other applications or services, each integration point comprising a plurality of integration interfaces, each integration interface comprising an associated design pattern, data fields and business rules.

15. An apparatus having a hardware processor to develop a software application, the apparatus comprising:
   a. a computer system comprising a group of computers on the server side, and a plurality of client computers connecting to the server side computers over a distributed network, and wherein the hardware processor is executed for:
   b. managing communications among several groups who are working on a common software application functioning to aid software development by providing an interactive visual subsystem among the team members;
   c. forming a requirements database functioning to further streamline the creation of the detailed application requirements specifications, said [means for forming a] requirements database including visually defined user story workflows, user interface screens, visually organized user interface widgets, style sheets, and business rules;
   d. forming a requirements database functioning to further streamline the creation of the detailed application requirements specifications, said requirements database including integration points between the software application and other applications or services, integration interfaces comprising a plurality of data fields;
   e. forming a design database functioning to further streamline the creation of the detailed application design specifications, said [means for forming a] design database including design patterns; each design pattern comprising design components, program logic flow steps, arrows connecting the design components;
   f. selecting a design pattern to be assigned to a UI screen of an application feature functioning to re-use a pre-defined application design pattern;
   g. selecting a design pattern to be assigned to an integration interface of an integration point functioning to re-use a pre-defined integration design pattern;
   h. assisting the development of the source code program modules using the requirements and design specifications which define the software application functioning to complete a delivery of the software application features; and
   i. assisting the testing of the source code program modules using the requirements and design specifications which define the software application functioning to complete a delivery of the software application features.

16. The apparatus of claim 15 further comprising the step of:
   a. automatically generating from the user defined requirement specifications, an audio-video playback sequence explaining the process workflow with computer generated speech from user defined text for UI widgets and visual pop-up text elements describing the user interaction with the software application for a plurality of application features, functioning to aid in immediate and effective grasping of the application feature.

17. The apparatus of claim 15 further comprising:
   a. automatically generating a detailed requirements document containing a cover page, computer generated diagrams for UI screens, detailed descriptions of UI widget requirements attributes, business rules, notes, change history, file attachments, open questions functioning to aid in effective understanding of the application feature requirements and reducing effort in writing such a document manually;
   b. automatically generating a detailed technical design document for an application feature containing a cover page, computer generated UI screen images, computer generated design diagrams, detailed descriptions of design components, notes, change history, file attachments, open questions functioning to aid in effective understanding of the application feature technical design and reducing effort in writing such a document manually; and c. automatically generating a detailed technical design document for an integration point containing a cover page, computer generated design diagrams, detailed descriptions of design components, notes, change history, file attachments, open questions functioning to aid in effective understanding of the integration point technical design and reducing effort in writing such a document manually.

18. The apparatus of claim 15 further comprising:
a. visually depicting a plurality of changed items associated with each user interface screen, business rule and integration interfaces, wherein the changes are visually rendered with a color coding scheme that identifies the type of change—a new item, changed item or deleted item, functioning to aid in immediate and effective grasping of the incremental changes made in a user-definable time period; and
b. tracking and visually depicting a plurality of UI widgets deleted by the user, in a separate area of the visual rendering of the UI, to aid in effective understanding of deleted UI widgets from the UI requirements specification.

19. The apparatus of claim 15 further comprising:
a. automatically generating an effort estimate chart associated with the development of said UI screens and Integration Interfaces, functioning to create an accurate effort estimate and lower the labor cost of manual estimation, with a user-definable estimation method selected from one of several methods including:
    i. calculating effort estimate defined by complexity factors;
    ii. calculating effort estimate defined by type of UI widget being developed and type of change (new, modified or deleted);
    iii. calculating effort estimate defined by underlying design components in the design pattern wherein the estimate accounts for fixed and variable cost of development wherein the variable cost varies by the number of UI widgets or data fields in the integration interface;
    iv. a fixed effort estimate for a task; and
    v. calculating effort estimate as a percentage of a related effort.

20. The apparatus of claim 15 further comprising:
a. automatically generating tasks necessary to complete the development, functioning to create an accurate task list and lower the labor cost of creating tasks manually, by defining and applying task creation templates specifying attributes including:
    i. task type selected from a pre-defined list;
    ii. name and description;
    iii. estimation method;
    iv. email notification method upon task completion;
    v. whether a review is required to complete the task; and
b. organizing visually the automatically generated tasks in status lanes with summary information about said tasks and the ability to update the status of said tasks with navigation controls to move the task to the next or previous status lanes, functioning to aid in immediate and effective grasp of project management related aspects.

21. The apparatus of claim 15 further comprising:
a. automatically generating a plurality of test cases associated with a plurality of requirements specifications for UI widgets and business rules for each UI screen of a plurality of software application features, functioning to improve the accuracy of test cases and lower the cost from manual creation of test cases; and
b. limiting the test cases generated based on a user-definable time period or development iteration for constraining the test cases to the changes made to the requirements in the specified time period, functioning to aid in incremental, iterative development.

22. The apparatus of claim 15 further comprising:
a. visually depicting defects associated with a UI screen overlaid visually on individual UI widgets with color coded aid for defect severity, functioning to aid in immediate and effective identification of open defects;
b. visually depicting defects associated with a process workflow of a software application feature, overlaid visually on individual UI steps with color coded aid for defect severity, functioning to aid in immediate and effective identification of open defects across the software feature;
c. visually depicting the planned development iteration on individual UI steps of a process workflow, functioning to aid in immediate and effective identification of project management related information for developing the software feature; and
d. visually depicting the planned development iteration on a plurality of integration interfaces of an integration point, functioning to aid in immediate and effective identification of project management related information for developing the software feature.

23. The apparatus of claim 15 further comprising:
a. calculating the predicted date for closing of defects across the software application, functioning to aid in improved visibility of project status by:
    i. measuring and tracking defect opening rate over time;
    ii. measuring and tracking defect resolution rate over time;
    iii. measuring and tracking defect re-opening rate over time;
    iv. measuring and tracking the severity mix of the defects over time;
    v. projecting out defect open rates and resolution rates for future;
    vi. applying the projected open, close and re-open rates to the future and calculating a daily projected inventory of defects; and
    vii. calculating the predicted date for defect closure for best case, worst case and expected case scenarios.

24. The apparatus of claim 15 further comprising:
a. searching for user-defined text terms across the entire user defined content in the system, functioning to quickly locate items of interest wherein a plurality of results of the text search are displayed in a structure comprising:
    i. project where the search result is found;
    ii. application feature where the search result is found;
    iii. UI screen where the search result is found;
    iv. matching element on the UI screen where the search result is found;
    v. matching text attribute of the matching element where the search result is found;
    vi. matching text within the matching attribute with the search terms highlighted; and b. allowing users to specify from a plurality of content areas to include in the search results, functioning to limit the scope of the text search.

25. A method to develop a software application, the method executed by software instructions stored in a memory and executed by a hardware processor, comprising the steps of:
    a. managing communications among several groups who are working on a common software application by providing an interactive subsystem among team members;
    b. defining a process workflow for a plurality of software application features;
    c. defining a plurality of user interface (UI) details including UI widgets associated with each step of the process workflow;
    d. defining a plurality of requirements specific details including playback text associated with a plurality of UI widgets;
    e. automatically generating from the user defined requirements specifications, an audio-video playback sequence explaining the process workflow with computer generated speech from user defined text for a plurality of UI widgets, and using visual pop-up text elements describing the user interaction with said software application for a plurality of application features, aiding in immediate and effective grasping of the application feature; and
    f. producing the finished software application by programming and testing the software application according to said requirements and design specifications.

* * * * *